United States Patent
Czainski

(10) Patent No.: US 10,059,212 B2
(45) Date of Patent: Aug. 28, 2018

(54) SAFETY SYSTEM, A METHOD OF OPERATING A SAFETY SYSTEM AND A METHOD OF BUILDING A SAFETY SYSTEM

(71) Applicant: Bombardier Transportation GmbH, Berlin (DE)

(72) Inventor: Robert Czainski, Szczecin (PL)

(73) Assignee: Bombardier Transportation GmbH, Berlin (DE)

( * ) Notice: Subject to any disclaimer, the term of this patent is extended or adjusted under 35 U.S.C. 154(b) by 360 days.

(21) Appl. No.: 14/652,246

(22) PCT Filed: Dec. 16, 2013

(86) PCT No.: PCT/EP2013/076705
§ 371 (c)(1),
(2) Date: Jun. 15, 2015

(87) PCT Pub. No.: WO2014/095722
PCT Pub. Date: Jun. 26, 2014

(65) Prior Publication Data
US 2015/0321567 A1    Nov. 12, 2015

(30) Foreign Application Priority Data
Dec. 17, 2012 (GB) .................................. 1222712.0

(51) Int. Cl.
*B60L 11/18* (2006.01)
*H01F 38/14* (2006.01)
(Continued)

(52) U.S. Cl.
CPC .............. *B60L 11/182* (2013.01); *B60L 3/00* (2013.01); *B60L 5/005* (2013.01);
(Continued)

(58) Field of Classification Search
CPC ...... B60L 3/00; B60L 3/04; B60L 3/08; B60L 11/00; B60L 11/18; B60L 11/1803; B60L 11/1805; B60L 11/1809; B60L 11/182
See application file for complete search history.

(56) References Cited

U.S. PATENT DOCUMENTS

| 2011/0074346 A1 | 3/2011 | Hall et al. |
| 2012/0049850 A1 | 3/2012 | Reime |

(Continued)

FOREIGN PATENT DOCUMENTS

| CN | 101335469 A | 12/2008 |
| DE | 3619308 C1 | 12/1987 |

(Continued)

*Primary Examiner* — Robert J McCarry, Jr.
(74) *Attorney, Agent, or Firm* — The Webb Law Firm

(57) ABSTRACT

The invention relates to a safety system for an inductive power transfer system for transferring power to a vehicle on a surface of a route, wherein the primary unit comprises at least one primary winding for generating an electromagnetic primary field for the inductive power transfer, wherein a charging surface of the route is assigned to the primary winding. The safety system comprises at least one inductive sensing system, wherein the inductive sensing system comprises multiple detection windings wherein the multiple detection windings are arranged in an array structure, and wherein the array structure covers the charging surface at least partially. Furthermore, the invention relates to a method of operating such a safety system and a method of building such a safety system.

25 Claims, 12 Drawing Sheets

(51) Int. Cl.
    *H02J 50/10*    (2016.01)
    *H02J 50/70*    (2016.01)
    *H02J 50/60*    (2016.01)
    *B60L 5/00*     (2006.01)
    *B60M 1/04*     (2006.01)
    *B60M 7/00*     (2006.01)
    *H02J 5/00*     (2016.01)
    *B60L 3/00*     (2006.01)

(52) U.S. Cl.
    CPC ............ *B60L 11/1837* (2013.01); *B60M 1/04* (2013.01); *B60M 7/003* (2013.01); *H01F 38/14* (2013.01); *H02J 5/005* (2013.01); *H02J 50/10* (2016.02); *H02J 50/60* (2016.02); *H02J 50/70* (2016.02); *B60L 2200/18* (2013.01); *B60L 2200/26* (2013.01); *B60L 2200/36* (2013.01); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01)

(56) References Cited

U.S. PATENT DOCUMENTS

| | | |
|---|---|---|
| 2012/0146580 A1 | 6/2012 | Kitamura |
| 2012/0187757 A1 | 7/2012 | Wechlin et al. |
| 2013/0169062 A1 | 7/2013 | Maikawa et al. |
| 2013/0307532 A1 | 11/2013 | Reime |
| 2014/0139038 A1 | 5/2014 | Konno et al. |
| 2014/0145514 A1 | 5/2014 | Konno et al. |
| 2014/0191715 A1 | 7/2014 | Wechlin et al. |

FOREIGN PATENT DOCUMENTS

| | | | |
|---|---|---|---|
| DE | 10318350 B3 | 12/2004 | |
| DE | 202009009693 | * 11/2010 | ............ B60L 11/182 |
| DE | 202009009693 U1 | 12/2010 | |
| DE | 102009033236 A1 | 1/2011 | |
| DE | 102011015980 A1 | 10/2012 | |
| EP | 2317625 A2 | 5/2011 | |
| JP | 549107 A | 2/1993 | |
| JP | 2000215282 A | 8/2000 | |
| JP | 2011072074 A | 4/2011 | |
| JP | 201275200 A | 4/2012 | |
| JP | 2012249401 A | 12/2012 | |
| JP | 2012249405 A | 12/2012 | |
| WO | 2009081115 A1 | 7/2009 | |
| WO | 2010133328 A1 | 11/2010 | |
| WO | 2011116874 A2 | 9/2011 | |
| WO | 2012004092 A2 | 1/2012 | |
| WO | 2012047779 A1 | 4/2012 | |
| WO | 2012104086 A2 | 8/2012 | |
| WO | 2012160136 A2 | 11/2012 | |
| WO | 2012164973 A1 | 12/2012 | |
| WO | 2013036947 A2 | 3/2013 | |

* cited by examiner

SAFETY SYSTEM, A METHOD OF OPERATING A SAFETY SYSTEM AND A METHOD OF BUILDING A SAFETY SYSTEM

CROSS-REFERENCE TO RELATED APPLICATIONS

This application is the United States national phase of International Application No. PCT/EP2013/076705 filed Dec. 16, 2013, and claims priority to United Kingdom Patent Application No. 1222712.0 filed Dec. 17, 2012, the disclosures of which are hereby incorporated in their entirety by reference.

BACKGROUND OF THE INVENTION

Field of the Invention

The invention relates to a safety system for an inductive power transfer system, in particular an inductive power transfer system for transferring electric energy to a vehicle which is standing or travelling on a surface of a route. Furthermore, the invention relates to a method of operating such a safety system and a method of building such a safety system.

Description of Related Art

WO 2012/047779 A1 discloses a safety system for a charger to provide protection with respect to an object that may become hot during operation of the charger, wherein the safety system comprises a detection subsystem configured to detect presence of the object and substantial proximity to the charger and a notification subsystem operatively coupled to the detection subsystem and configured to provide an indication of the object. The publication discloses that one or more inductive sensors can be integrated into a source device, source housing, vehicle, or surrounding area to detect obstructions and foreign objects and/or materials between the source and device resonators.

WO 2009/081115 A1 discloses a primary unit for use in an inductive power transfer system, the primary unit being operable to transmit power wirelessly by electromagnetic induction to at least one secondary unit of the system located in proximity to the primary unit and/or to a foreign object located in set proximity, wherein the primary unit comprises driving means operable to drive the primary unit so that in a driven state the magnitude of an electrical drive signal supplied to one or more primary coils of the primary unit changes from a first value to a second value. Furthermore, the primary unit comprises means for assessing the effect of such driving on an electrical characteristic of the primary unit and means for detecting in dependence upon the assessed effect the presence of said secondary unit and/or foreign object located in proximity to said primary unit.

EP 2317625 A2 discloses a primary device for inductive power transfer to a secondary device, wherein the primary device comprises a primary coil, wherein the primary device is being configured to (i) operate in a first mode during which the primary coil transfers power to inductive coupling to the secondary device and (ii) operate in a second mode during which a foreign object is detected. Furthermore, a primary control is configured to operate the primary coil (i) using a first frequency during the first mode and (ii) using a second frequency during the second mode.

DE 20 2009 009 693 U1 and the DE 10 2009 033 236 A1 disclose a device for inductive transmission of electrical power from a stationary unit with at least one primary inductance to a vehicle adjacent to this stationary unit having at least one secondary inductor, wherein the stationary unit comprises means for detecting the presence of an electrically conductive object within a predetermined space adjacent to the primary inductor.

It is an object of the present invention to provide the safety system for an inductive power transfer system, a method of operating such a safety system and a method of building a safety system which provides reliable and fast detection of a foreign object, in particular a metal object, located in proximity of a primary winding structure of the primary winding.

It is a basic idea of the present invention that a foreign object located in the proximity of a primary winding structure of the primary unit will cause a change in electrical characteristics of a detection structure, in particular a change of an inductance of the detection structure.

The present invention can be applied to the field of energy transfer to any land vehicle, including track bound vehicles, such as rail vehicles (e.g. trams), but also to road automobiles, such as individual (private) passenger cars or public transport vehicles (e.g. busses). A problem in such devices is that it is generally not possible to mechanically prevent foreign objects, in particular objects made of metal, from being placed into proximity of the primary unit of an inductive power transfer system. Such foreign objects may e.g. comprise a coin, a can, a key, a tool and other objects. The varying magnetic field generated by the primary unit and a secondary unit may induce current in the foreign objects made of metal and in other objects or fluids. Such currents may cause power losses and heating of the object. Heating of the foreign objects made be dangerous for example to persons trying to touch and remove the foreign object and/or may damage the surface the foreign object is placed on or parts of the primary unit. Also, a heated object can cause fire.

SUMMARY OF THE INVENTION

A safety system for an inductive power transfer system is proposed. In particular, a safety system for an inductive power transfer system for transferring electric energy to a vehicle which is standing or travelling on a surface of a route, in particular for a primary system of said power transfer system, is proposed. In general, the safety system can be part of the primary unit and/or the secondary unit of the inductive power transfer system.

The inductive power transfer system comprises a route-sided primary unit with a primary winding structure. The primary winding structure generates a primary electromagnetic field which is received by a vehicle-sided secondary unit, which is also known as receiver or pick-up. In between the primary winding structure and a secondary winding structure of the secondary unit, there is an air gap through which the primary field extends. The secondary winding structure can generate a secondary field, e.g. if a current flows in the secondary winding structure. This current can e.g. be generated at least partially by the mutual induction between the primary winding structure and the secondary winding structure.

The inductive power transfer system can be a transfer system for so-called static energy transfer or static charging, wherein the vehicle to which the energy is transferred to does not move, i.e. is at a halt or rests. In this case, the primary unit can be designed as a so-called charging pad, wherein the charging pad is integrated into the route or mounted on the route surface (elevated charging pad).

The inductive power transfer system can also be a so-called dynamic transfer system, wherein the vehicle to which the energy is transferred to travels along the driving surface of the route.

A charging surface of the route is assigned to the primary winding. The charging surface can be a subpart of the route surface through which the primary field or a predetermined portion, e.g. a portion larger than 80%, 90% or 95%, of the primary field extends during inductive power transfer, in particular during static charging. The charging surface can have the same or larger dimensions, e.g. width and length, as an envelope of the primary winding structure, e.g. a rectangle comprising the winding structure of the primary winding. In case of a charging pad, the charging surface can correspond to the surface of the charging pad.

The primary winding structure is usually arranged under a driving surface or standing surface of the route or within such a driving or standing surface. The primary field consequently extends through a part of the driving or standing surface. A foreign object can heat up because of currents induced within the foreign object.

A total field, which can be also referred to as power system transfer field, at least partially consists of the primary field. If no secondary winding structure is located within the proximity, e.g. above the primary winding structure, the total field will be equal or nearly equal to the primary field. If a secondary winding structure is located within the proximity, e.g. above the primary winding structure, the total field results from the superposition of the primary field and the secondary field, wherein the secondary field is generated by the secondary winding structure.

The foreign object located within this part or charging surface can heat up because of currents induced within the foreign object. The currents induced within the foreign object can be caused by the total field.

The primary unit comprises the aforementioned primary winding for generating an electromagnetic primary field for the inductive power transfer which can be received by the aforementioned secondary unit. Furthermore, the safety system comprises at least one inductive sensing system, wherein the inductive sensing system comprises multiple detection windings.

According to the invention, the multiple detection windings are arranged in an array structure. The array structure covers the charging surface at least partially, e.g. more than 80%, 90% or 95% of the charging surface. In this context, "covers" means that a least a part of the, preferably the total, primary field or total field extends through the array structure or a surface provided by the array structure. The array structure can be part of the primary unit.

The term "covers" can also mean that in a common plane of projection, an area enclosed by a minimal envelope of the array structure overlaps with the charging surface at least partially.

An array structure can be a matrix-like structure providing multiple rows and columns, wherein in each row/column-position a detection winding is arranged. Center points of the detection windings can be arranged with respect to one another with predetermined longitudinal and/or lateral distances, wherein a longitudinal direction is oriented parallel to a direction of travel of the vehicle and the lateral direction is oriented perpendicular to the longitudinal direction.

In other words, a sheet-like structure comprising multiple detection windings is provided. The multiple detection windings can be located in an interspace provided by the primary winding and the charging surface. The multiple detection windings can be part of the route, e.g. located in a layer of the route which is arranged under the route surface or located in a layer of the route which provides the route surface. The primary winding structure can be covered by the array of the multiple detection windings.

Each of the detection windings provides a detection surface which is provided by the area enclosed by the winding structure of the detection winding. During inductive energy transfer, at least a part of the primary field or total field, preferably the total primary field or total field, will extend through the array structure of the detection windings. In this case, the primary field or total field will also extend through the detection surfaces provided by the detection windings. It is possible that the dimension(s) of the detection winding(s) is/are chosen depending on the dimension of the smallest object to be detected. In particular, the detection winding can be designed such that a detection surface or area of the detection winding is smaller than, equal to or, with a predetermined percentage, e.g. 10%, 20%, 50% or even more percent, larger than the smallest object to be detected.

The safety system can also comprise one or more evaluation units which are connected to one, a predetermined number or all detection windings. The evaluation unit(s) is/are designed such that electric characteristics and/or parameters, e.g. an output voltage, of each detection winding can be determined.

For example, the evaluation unit(s) is/are designed such that an inductance of each detection winding can be determined. If a foreign object, in particular a metal object, is placed in the proximity of the primary winding, this object will also cause a change of inductance of one or more detection windings. By determining the inductance and e.g. comparing the inductance to a reference inductance, the presence of a foreign object can be detected reliably.

Furthermore, it is possible to determine or estimate a position of the foreign object depending on an output signal of the detection windings of the array of detection windings with respect to the array of detection windings. For example, depending on the output signal, e.g. an output voltage, of the detection windings, one or more detection winding(s) can be determined, wherein the output signal(s) of this/these detection winding(s) is/are altered or influenced by an object placed within the proximity of the detection winding(s), e.g. above or under a detection surface of the detection winding(s). If a position of the detection windings with respect to the primary unit is known, a position of the object with respect to the primary unit, in particular the primary winding structure, can be determined.

The arrangement of detection windings in an array structure advantageously allows a reliable detection of an object in a predetermined surface area, which can also be referred to as surveillance area, of the route.

The surveillance surface can be assigned to the array structure. The surveillance surface denotes a part of the route surface on which the object should be located in order to be detectable with a predetermined reliability. The surveillance surface can be equal to the charging surface. An object located on the surveillance surface will change an output signal of the array of detection windings at least with a predetermined percentage, e.g. with at least 10%, 20%, or 50%.

In another embodiment, the inductive sensing system comprises at least one excitation winding. The at least one excitation winding generates an excitation field which can be different from the primary field or total field. The excitation field can be received by the detection winding(s). For example, the at least one excitation winding and the detection windings can be arranged such that the total or at least a predetermined part, e.g. more than 80%, 90%, or 95%, of a magnetic flux of the excitation field extends through the detection surface of at least one detection winding. It is possible that a single detection winding is assigned to a single excitation winding. This means that the excitation field or a predetermined part of it generated by the excitation winding is exclusively received by the single detection winding. Alternatively, multiple detection windings can be assigned to a single or to multiple excitation winding(s). Furthermore, multiple excitation windings can be assigned to a single or multiple detection winding(s).

The excitation field is an alternating electromagnetic field. A frequency of the excitation field can be different from an operating frequency of the primary field. In particular, the frequency of the excitation field can be higher, in particular many times higher, than the operating frequency of the primary field, e.g. higher than 20 kHz, e.g. in the range of 200 kHz to 10000 kHz. The use of an excitation winding allows an active object detection, wherein properties of the excitation field are monitored. In contrast, the embodiments using no excitation winding allow a passive object detection, wherein only properties of a winding structure are monitored.

The detection winding is different from the primary winding structure and different from the secondary winding structure of the inductive power transfer system. Therefore, the at least one detection winding is added to the existing primary and secondary winding structures of the inductive power transfer system.

If a foreign object, in particular a metal object, is placed on the charging surface, the magnetic flux provided by one or more excitation fields through the detection surface(s) of one or more detection windings will change. This change will cause a change of (an) output voltage(s) provided by one or more detection winding(s). Hence, the presence of a foreign object can be detected. As each detection winding is assigned to a specific subarea of the charging surface, the area of the location of the foreign object can also be determined.

The safety system can also comprise a notification system which, in case a foreign object is detected, notifies a user and/or activates a safe operation of the primary unit, e.g. switches the primary unit off. The notification system can for instance generate a visual, acoustic or any other type of warning signal.

The proposed safety system advantageously allows detection a foreign object placed in proximity of a primary unit. The detection can be a quick, sensitive and robust detection.

Thus, the invention is also related to an object detection system. If an object is detected, a notification signal, e.g. an electric, acoustic, haptic, or acoustic notification signal can be generated.

In another embodiment, at least one detection winding is part of an LC oscillating circuit. The LC oscillating circuit comprises at least one capacitive element, e.g. a capacitor. Furthermore, the LC oscillating circuit comprises at least one inductive element, wherein the inductive element is provided at least partially by the detection winding. Furthermore, the LC oscillating circuit comprises a voltage generator which is able to provide an alternating voltage with the resonant frequency of the oscillating circuit. Output terminals of the voltage source are connected to a parallel connection of the capacitive element and the inductive element. Furthermore, the oscillating circuit can comprise an element with a predetermined impedance, wherein the element can be arranged such that the oscillating circuit is decoupled from the voltage source.

The oscillating circuit is designed such that if a foreign object is placed within the proximity of the detection winding, the oscillating circuit is detuned. In this case, the changed or detuned resonant frequency of the oscillating circuit does not match the operating frequency of the voltage source.

The resonant current can decrease significantly if the oscillating circuit is detuned. This will, in turn, result in a voltage drop of the voltage falling across the aforementioned parallel connection.

Depending on the voltage falling across the parallel connection of the inductive element and the capacitive element, the presence of the foreign object in the proximity of the detection winding can be detected. Such a design of a detection winding provides a high detection sensitivity and an increased robustness of detection.

The detection winding being part of a LC oscillating circuit does not depend on the feature that the inductive sensing system provides multiple detection windings, in particular in an array structure. It is therefore possible that the inductive sensing system comprises at least one detection winding, wherein the detection winding is part of a LC oscillating circuit. Such a safety system constitutes an independent invention.

In another embodiment, a predetermined number of oscillating circuits are connected parallel to each other, wherein the inductive elements of each of the oscillating circuits are at least partially provided by a detection winding respectively. This advantageously allows operating multiple oscillating circuits by one voltage source.

In this case, a voltage falling across the parallel connection of all oscillating circuits can be measured, e.g. by one single voltage sensor. Alternatively, the voltages falling across each of the oscillating circuits can be measured, e.g. by multiple voltage sensors.

The feature that multiple detection windings each provide an inductive element of LC oscillating circuits connected in parallel to each other does not depend on the feature that the inductive sensing system provides multiple detection windings in an array structure. It is therefore possible that the inductive sensing system comprises multiple detection windings, wherein each detection winding provides an inductive element of a LC oscillating circuit. Such a safety system constitutes an independent invention.

In another embodiment, the inductive sensing system is designed as a primary field or total field compensating sensing system. Alternatively or in addition, each detection winding is designed and/or arranged as a primary field or total field compensating winding. This means that the inductive sensing system and/or each of the detection windings is designed such that a voltage induced by the primary field or total field is eliminated or reduced due to the physical design of the inductive sensing system and/or the detection windings.

In the case of an existing primary field, in particular in the case of inductive power transfer to the vehicle, the inductive sensing system is exposed to the primary field or total field. This exposure can influence the electrical characteristics or parameters determined by e.g. the evaluation unit(s) and will therefore complicate the detection of foreign objects. If the sensing system and/or the detection windings is/are physically designed and/or arranged such that the effect of the primary field or total field on the determination of the electrical characteristics or parameters is eliminated or reduced, this will advantageously improve the reliability of detection during inductive power transfer.

In another embodiment, at least one of the detection windings comprises multiple, in particular an even number, e.g. two, of counter-oriented subwindings. This means that the subwindings are connected and/or arranged such that a current flowing through a first subwinding of the detection winding flows e.g. in a clockwise direction, wherein the same current flowing through a second subwinding of the detection winding flows in a counter-clockwise direction. The direction of current flow is defined with respect to an axis of symmetry or central axis of each subwinding, wherein the axes of all subwindings are oriented parallel to each other. In the case that the detection winding comprises more than two subwindings, the central axes of all subwindings can be arranged along a common axis with a predetermined distance, wherein the common axis can be oriented parallel to a longitudinal direction (which corresponds to a direction of travel of vehicles driving on the surface of the route) or a lateral direction (which corresponds to a direction perpendicular to the longitudinal direction). In this case, the voltages induced by the primary field or total field within the different subwinding will have different signs. Thus, the voltage induced by the primary field or total field can be eliminated or, at least, reduced.

The inductive sensing system being designed as a primary field or total field compensating sensing system or the detection winding being designed as a primary field or total field compensating winding does not depend on the feature that the inductive sensing system provides multiple detection windings, in particular in an array structure. A safety system comprising at least one primary field or total field compensating sensing system therefore constitutes an independent invention.

In another embodiment, the excitation winding is part of a LC oscillating circuit. The oscillating circuit can be designed as described above, wherein the inductive element is at least partially provided by the excitation winding. The LC oscillating circuit comprises at least one capacitive element, e.g. a capacitor. The oscillating circuit is designed such that if a foreign object is placed within the proximity of the excitation winding, the oscillating circuit is detuned. In this case, the changed or detuned resonant frequency of the oscillating circuit does not match the operating frequency of the voltage source.

The resonant current can, inter alia as a result of the previously described decoupling of the voltage source and the oscillating circuit, will decrease significantly if the oscillating circuit is detuned. This will, in turn, result in a voltage drop in a detection winding which receives the decreased magnetic field generated by the excitation winding.

Depending on the voltage falling across the terminals of the detection winding, the presence of the foreign object in the proximity of the excitation winding can be detected. Such a design provides a high detection sensitivity and an increased robustness of detection.

In another embodiment, the excitation winding(s) and the detection windings are arranged such that a foreign object located on or in the proximity of the charging surface is arranged in between the excitation winding(s) and the detection windings. In this case, the foreign object is located in an interspace between the excitation and the detection windings. If a vertical direction is defined as a direction perpendicular to a driving or standing surface of the route, the detection windings can be arranged above the excitation winding with a predetermined distance, wherein the charging surface is located in between the excitation and detection windings. It is possible to arrange the detection windings on a secondary side of the power transfer system. It is, for instance, possible to arrange the detection windings on a vehicle, e.g. at a bottom side of the vehicle. The detection winding can, for instance, be arranged in proximity of a secondary unit. It is also possible, that the secondary unit, e.g. a pick-up, comprises the detection unit. In this case, the output voltage of the detection winding can be evaluated on a vehicle side. In this case, the corresponding signals can additionally be transferred to the primary side.

This arrangement of the excitation and the detection windings advantageously provides a high sensitivity as a foreign object placed in the interspace will cause a significant change of the output voltage of the detection winding(s).

In an alternative embodiment, the excitation winding and the detection winding are arranged such that a foreign object located on or in the proximity of the charging surface is arranged above the excitation winding(s) and above the detection windings, e.g. with respect to the aforementioned vertical direction.

In this case, the array structure of detection windings is located in between the primary winding and the charging surface. Thus, the charging surface area is not located in between the excitation and the detection windings. For example, the excitation and the detection winding(s) can be located under the driving surface of the route. In this case, a foreign object is located in an outer space with respect to the space between the excitation and the detection windings. In this case, a sensitivity of detection is lower than in the previously described case but it is advantageously possible to reduce an installation space of the safety system. In this embodiment, the detection and the excitation windings can be part of the primary unit.

In another embodiment, the sole excitation winding or at least one of the excitation windings is provided by the primary winding. In this case, the detection windings can be assigned to a sole excitation winding. In order to generate the excitation field, the primary winding can be operated at a frequency different from the operating frequency during inductive power transfer.

This embodiment advantageously provides a high integration of the safety system into the power transfer system and therefore reduces the required installation space and building costs.

In a preferred embodiment, the excitation winding is provided by a winding structure different from the primary winding. If the safety system comprises multiple primary windings, it is possible that all excitation windings are provided by windings different from the primary windings. However, it is also possible that the primary winding provides a first excitation winding, wherein at least one winding different from the primary winding provides another excitation winding.

If the safety system comprises multiple excitation windings, these excitation windings can be designed different from the primary winding which advantageously allows increasing a sensitivity of detection. Also, the primary winding does not need to be operated at different frequencies. This allows detecting a foreign object also during an operation of the primary winding during inductive power transfer.

In another embodiment, an excitation winding or a group of multiple excitation windings is/are designed and arranged such that an excitation field, in particular a field pattern of the excitation field, is generated such that a magnetic flux based on the excitation field received by (a) corresponding detection winding(s) is zero or minimal in a normal operation mode. A normal operation mode means an operation mode wherein no foreign object is placed in the proximity of the detection winding. In this case, a single detection winding can be assigned to multiple excitation windings.

In this case, all or a predetermined percentage, e.g. 80%, 90% or 95%, of field lines of the field pattern of the excitation field can extend through the surface provided by the detection area of the detection winding such that the total magnetic flux which extends through each of the detection surface(s) of the detection winding(s) is zero or minimal through the normal operating mode.

This advantageously provides a high sensitivity concerning the placement of foreign objects of the proximity of the detection winding. In the normal operating mode, the output voltage of each of the detection windings will be zero or minimal as there is no magnetic flux, and consequently also no change of the magnetic flux, through the detection surface of each detection winding. A foreign object placed on the charging surface or in the proximity of the charging surface will alter the magnetic flux such that the magnetic flux received by at least one detection winding deviates from zero.

This, in turn, advantageously provides a high sensitivity of detection.

In another embodiment, the excitation winding is designed such that an even number of poles is provided, wherein the excitation winding and a corresponding detection winding are arranged and/or designed such that the magnetic flux generated by different poles, in particular at least a part of the magnetic flux generated by at least two poles, extends through the detection surface of the detection winding. A pole can e.g. be provided by a subwinding of the excitation winding. It is possible that the total or a predetermined part, e.g. 50%, of the magnetic flux of different poles extends through the detection surface.

This means that a current flowing through a first subwinding can generate a magnetic flux with a first direction through an area enclosed by the first subwinding (first pole). Also, the current can generate a magnetic flux with a direction opposite to the first direction through an area enclosed by the second subwinding (second pole). However, each magnetic flux generated by the current can have the same magnitude. If both magnetic fluxes extend through the detection surface, the resulting magnetic flux extending through the detection surface of the detection winding generated by such an excitation winding will be zero.

It is, however possible, to have more than two poles. It is also possible to provide the magnetic flux with the first direction by a first excitation winding and the magnetic flux with the second direction by a second separate excitation winding.

This advantageously allows a simple set up of an excitation winding providing a zero magnetic flux through the detection surface of the detection winding.

The excitation winding can be designed as a primary field or total field compensating excitation winding. For example, the excitation winding can comprise multiple, in particular an even number, of counter-oriented subwindings. Each subwinding can comprise a predetermined number of turns. The subwindings can be arranged and/or connected such that a current flowing through a first subwinding of the excitation winding flows e.g. in a clockwise direction, wherein the same current flowing through a second subwinding of the detection winding flows in a counter-clockwise direction. The direction of current flow is defined with respect to an axis of symmetry or central axis of each subwinding, wherein the axes of all subwindings can be oriented parallel to each other. In the case that the excitation winding comprises more than two subwindings, the central axes of all subwindings can be arranged along a common axis with a predetermined distance, wherein the common axis can be oriented parallel to a longitudinal direction (which corresponds to a direction of travel of vehicles driving on the surface of the route) or a lateral direction (which corresponds to a direction perpendicular to the longitudinal direction).

In this case, the voltages induced by the primary field or total field within the first and the second subwinding of the excitation will have different signs.

The inductive sensing system comprising at least one excitation winding does not depend on the feature that the inductive sensing system provides multiple detection windings, in particular in an array structure. It is therefore possible that the inductive sensing system comprises at least one excitation winding and is designed according to one of the previously described embodiments. Such a safety system constitutes an independent invention.

In another embodiment, the primary unit comprises an acoustic sensor and a current impulse generating means. By the current impulse generating means, a current impulse can be generated and applied to e.g. an excitation winding. It is also possible to apply the current impulse to one or multiple phase lines of the primary winding structure. In this case, an impulse-like excitation field is generated. This excitation field will generate eddy currents in a foreign metal object placed within the surveillance area. In an interaction of such eddy currents with the excitation field or another electromagnetic field, a force, in particular a Lorentz force, will act on the foreign metal object. As the force is an alternating force, the metal object can start to vibrate. Oscillations of the air or of the route structure providing the surface on which the object is placed can be caused by these vibrations, wherein said oscillations can be detected by the acoustic sensor. Alternatively or in addition, it is also possible that the object will be moved up, extended and/or deformed by the Lorentz forces. If the impulse ends, the object will return to the original state, e.g. fall down on the route surface or come back to the original shape. Because of small energy absorption of the environment, the object starts to vibrate on the surface as a result of this process.

This advantageously allows increasing a robustness of detection by providing an additional detection method.

It is also possible to detect an electromagnetic field generated by the eddy current within the foreign metal object. In this case, a permanent magnetic field can be generated, e.g. by a permanent magnet or an electromagnet, and the back-induced voltage which is induced by the magnetic field generated by the eddy current can be measured. This can be done by using a separate winding structure or the structure of the excitation winding.

The safety system comprising an acoustic sensor and a current impulse generating means does not depend on the feature that the inductive sensing system provides multiple detection windings, in particular in an array structure. A safety system comprising an acoustic sensor and a current impulse generating means therefore constitutes an independent invention.

In another embodiment, the safety system comprises a microwave transmitting device and a microwave receiving device. The transmitting device and receiving device can comprise or be designed as an antenna.

The transmitting device can be designed and/or arranged such that radar waves or microwaves can be emitted along the charging surface. In this case, the waves reflected by the foreign object can be received by receiving device which is built as a radar or microwave sensor. This allows an additional radar-based detection of foreign objects in the proximity of the primary unit.

In particular, the microwave transmitting device can be operated by or comprise an LC generator which generates the microwaves. The LC generator comprises at least one inductive element, one capacitive element and one voltage source. The inductive and capacitive element can be connected in parallel or in series. The voltage source provides voltage with the resonant frequency of the parallel or series connection of the inductive and capacitive element. The LC generator can be designed such that if a stationary, in particular metal, object is located within the proximity of the LC generator, the operating frequency of the LC generator is detuned because of the changed inductance of the inductive element.

In this case, the waves received by the receiving device will have frequency depending on the amount of detuning which, in turn, depends on the change of the inductivity of the LC generator by the foreign object. Based on the changed frequency, a stationary object can be detected.

In addition, it is also possible that the change of the frequency of the reflected microwaves can be caused by a moving object. This allows detection of moving objects within a detection range of the microwave transmitter-receiver configuration.

The transmitting device and the receiving device can be designed as elements separate from the detection windings or excitation windings.

In particular, metal objects can be detected by the proposed safety system. Also, moving objects, such as animals or the aforementioned vibrating metal object, can be detected by the proposed safety system due to an evaluation according to the Doppler effect.

The embodiment comprising the transmitting device and receiving device presents an independent invention. Thus, a safety system for an inductive power transfer system for transferring power to a vehicle on a surface of a route is described. A primary unit comprises at least one primary winding for generating an electromagnetic primary field for the inductive power transfer, wherein a charging surface of the route is assigned to the primary winding. The safety system comprises at least one microwave transmitting device and at least one microwave receiving device. The transmitting device can be designed and/or arranged such that radar waves or microwaves can be emitted along the charging surface. The receiving device can be designed and/or arranged such that reflected radar waves or microwaves emitted along the charging surface can be received.

In another embodiment, at least one of the detection windings is designed as the microwave receiving device and/or one excitation winding is designed as the microwave transmitting device. Designing at least one detection winding as a microwave receiving and/or excitation winding as the microwave transmitting device does not depend on the feature that the inductive sensing system provides multiple detection windings, in particular in an array structure. A safety system comprising at least one of such a detection winding or excitation winding therefore constitutes an independent invention.

In another embodiment, the detection windings are designed as circular detection windings. The circular detection windings can be arranged such that detection surfaces of the detection windings cover a predetermined part of the charging surface, e.g. in a common plane of projection. A circular detection winding provides an optimal sensitivity with respect to the circular detection surface of the detection winding. The sensitivity can e.g. be constant for the total detection surface or 99% of the detection surface of the detection winding.

This advantageously provides high detection sensitivity.

In another embodiment, the circular detection surfaces of at least two circular detection windings at least partly overlap, e.g. in a common plane of projection. If detection surfaces of neighboring detection windings do not overlap, there are interspaces located outside the detection surface in between the detection windings. These interspaces will decrease the overall sensitivity of the safety system or will even make the detection impossible. By having detection windings with overlapping detection surfaces, this disadvantage can be advantageously overcome.

Designing the detection windings as circular detection windings does not depend on the feature that the inductive sensing system provides multiple detection windings, in particular in an array structure. A safety system comprising at least one of such a detection winding therefore constitutes an independent invention.

In a preferred embodiment, the detection windings are designed as hexagonal-shaped or rectangular-shaped detection windings. The multiple hexagonal-shaped detection windings can be arranged in an array structure such that detection surfaces of the detection windings cover a predetermined part of the charging surface, e.g. 80%, 90% or 95%, for example in a common plane of projection. It is also possible to use square-shaped or rectangular-shaped detection windings. However, the proposed hexagonal-shaped detection windings advantageously provide a high sensitivity within the detection surfaces enclosed by the detection windings and further advantageously allow arranging multiple detection windings such that interspaces between the detection windings are minimized.

In particular, the multiple hexagonal-shaped detection windings are arranged such that a honeycomb structure is provided. This honeycomb structure advantageously provides a high detection sensitivity for a large area of the route surface, i.e. an optimal detection coverage. The shape of a hexagon is similar to a circle and has the advantage of having the same response to a test object placed in an arbitrary position within the whole detection surface and additional minimizes the interspaces between the detection windings.

Designing the detection windings as hexagonal- or rectangular shaped detection windings does not depend on the feature that the inductive sensing system provides multiple detection windings, in particular in an array structure. A safety system comprising at least one of such a detection winding therefore constitutes an independent invention.

A predetermined number of the detection windings within the array can provide the previously described subwindings of one detection winding. In this case, the subwindings can be arranged and/or connected such that the aforementioned primary field or total field compensating detection winding is provided.

In a preferred embodiment, the primary unit comprises at least one total field cancellation means for generating a cancellation field, wherein the cancellation means is designed and/or arranged such that the total field can be at least partially cancelled by the cancellation field. The total field is the electromagnetic field resulting from the primary field generated by the primary winding structure and, if applicable, a secondary field generated by the secondary winding structure.

The cancellation means can comprise one or more cancellation winding(s) which are different from the excitation winding(s) and the detection winding(s). In particular, the cancellation means can be assigned to a cancellation area of the route surface, in particular of the surface of the surveillance area, wherein the cancellation field is designed such that the total field extending through the cancellation area is cancelled or reduced by the cancellation field.

Preferably, the cancellation means is provided by the excitation winding(s) and/or the detection winding(s). This advantageously allows operating the detection and excitation winding in a first operating mode to detect a foreign object and, in a different operating mode, to cancel the total field in an area where the foreign object is located. It is possible that the area of location or the object position is determined, e.g. depending on output voltages of specific detection windings. Consequently, the cancellation means, e.g. the detection windings and/or one or more excitation winding(s), which are assigned to the area of location of the object position, can be operated such that the cancellation field is generated. The cancellation area can be equal to or larger than the aforementioned detection area. Thus, cancellation means have to be designed accordingly.

Such a safety system advantageously allows detecting a foreign object and furthermore ensures a safe operation of the inductive power transfer system. If the total field within the area of placement is cancelled or reduced, effects on, e.g. heating of, the object will be prevented or reduced. This, in turn, reduces a risk of injuring a person or damaging e.g. the primary unit.

Providing a safety system comprising at least one total field cancellation means does not depend on the feature that the inductive sensing system provides multiple detection windings, in particular in an array structure. A safety system comprising at least one total field cancellation means therefore constitutes an independent invention.

Further proposed is a method of operating a safety system according to one of the previously described embodiments. In such a method, an output signal of each of the multiple detection windings is measured and an electrical characteristic or parameter, e.g. an inductance or output voltage of each detection winding, is determined depending on the measured output signal and compared to a reference value. If the difference of the electric characteristic or parameter to the reference value is higher than a predetermined threshold value, the presence of a foreign object can be detected and a notification signal can be generated. This advantageously allows a simple detection of a foreign object in the proximity of the primary unit.

In another embodiment, an excitation field is generated by at least one excitation winding. The excitation field or a part of the excitation field is received by at least one corresponding detection winding. This means that at least a part of a magnetic flux of the excitation field extends through a detection surface of the corresponding detection winding(s). Then, an output voltage of the at least one detection winding is evaluated. If the output voltage deviates from a predetermined output voltage, a notification signal can be generated.

It is also possible, that a notification signal is generated, if a course and/or a magnitude of the output voltage deviates from a predetermined course and/or magnitude of the output voltage.

This advantageously provides a simple method to quickly and reliably detect a foreign object in the proximity of a primary unit of an inductive power transfer system.

In another embodiment, an acoustic sensor captures sound waves in a surveillance area of the primary unit after the excitation field has been generated. An output signal of the acoustic sensor is evaluated. This advantageously increases a robustness of detection. As explained previously, eddy current can cause a vibration of the foreign metal object and therefore sound waves are being generated. By measuring these sound waves, a presence of a foreign object can be (additionally) detected.

In another embodiment, a radar or microwave signal is emitted along the charging surface, wherein the reflected signal is received by at least one microwave receiving device, wherein a radar- or microwave based object detection based on the received signal is conducted. This advantageously allows a detection robustness of the proposed method.

In another embodiment, a cancellation field is generated by at least one total field cancellation means if a foreign object has been detected. In particular, the cancellation field can be generated such that the total field is only cancelled in an area of location, wherein the area of location is the area where a detected foreign object is located on the route surface. In this case, only a part, in particular a local part, of the total field is cancelled or reduced. This advantageously provides a location specific cancellation or reduction of the total field while an operation of the primary unit during inductive power transfer does not need to be interrupted in total.

Further proposed is a method of building a safety system for a primary unit of an inductive power transfer system, wherein the primary unit comprises at least one primary winding for generating an electromagnetic primary field for the inductive power transfer, wherein a charging surface of the route is assigned to the primary winding. The method comprises the steps of
  providing multiple detection windings,
  arranging the detection windings in an array structure,
    wherein the array structure covers the charging surface at least partially.

BRIEF DESCRIPTION OF THE DRAWINGS

In particular, the detection windings can be arranged such that a foreign object located on the charging surface changes a magnetic flux through (a) detection surface(s) of the detection windings.

The method advantageously allows modifying existing primary units by providing additional detection windings.

Furthermore, at least one excitation winding can be provided, wherein the at least one excitation winding can be different from the primary winding. The excitation winding is arranged such at least a predetermined part of a magnetic flux of an excitation field extends through a detection surface of the at least one detection winding.

This advantageously provides a safety system, wherein the generation and detection of the excitation field is independent from the primary winding.

Figure 1:
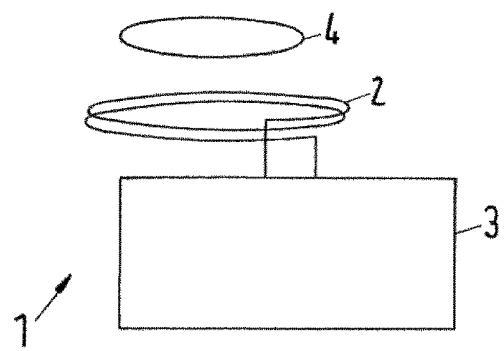

Examples of the invention will be described with reference to the attached figures in the following. The figures show:
  FIG. 1 a schematic block diagram of an inductive detection system,
  FIG. 2 a schematic diagram of the proposed safety system in a first embodiment,
  FIG. 3 a schematic diagram of the proposed safety system in a second embodiment,
  FIG. 4 a schematic diagram of the proposed safety system in a third embodiment,
  FIG. 5 a schematic layout of an excitation winding and a detection winding, FIG. 6a a schematic design of one detection winding and multiple excitation windings, FIG. 6b another schematic design of one detection winding and multiple excitation windings, FIG. 7 another schematic design of one detection winding and multiple excitation windings, FIG. 8 an equivalent circuit of the system shown in FIG. 7, FIG. 9 a schematic diagram of the proposed safety system in a fourth embodiment, FIG. 10 an equivalent circuit of the system shown in FIG. 9, FIG. 11 a schematic diagram of the proposed safety system in a fifth embodiment, FIG. 12 a schematic diagram of the proposed safety system in a sixth embodiment, FIG. 12a a schematic diagram of a proposed safety system in a seventh embodiment FIG. 13 a schematic diagram of the proposed safety system in a eighth embodiment, FIG. 14 an array structure of circular detection windings, FIG. 15 another array structure of circular detection windings, FIG. 16 a honeycomb array structure of hexagonal-shaped detection windings, FIG. 17 a detailed view of hexagonal-shaped detection windings, FIG. 18 a schematic diagram of the proposed safety system in a ninth embodiment, FIG. 19 a schematic diagram of the proposed safety system in a tenth embodiment, and FIG. 20 a schematic diagram of a total field compensating winding.

DETAILED DESCRIPTION OF THE INVENTION

FIG. 1 shows a schematic block diagram of an inductive sensing system 1. The inductive sensing system 1 comprises a detection winding 2 having two turns. The detection winding 2 is connected to an evaluation unit 3 which evaluates an inductance of the detection winding 2.

An inductance can for instance be determined by one or more of the following methods:
a) measuring a current change at connecting terminals of the detection winding 2 with a constant voltage falling across the connection terminals,
b) measuring a reactance with a constant current flowing through the connection terminals of the detection winding 2 by evaluating a voltage change of a voltage falling across the terminals,
c) measuring the so-called heterodyne frequency, e.g. by a direct digital frequency measurement and/or
d) compare the resonant frequency of a resonant circuit provided by the detection winding 2 and an additional capacitor with a reference frequency.

An object 4 is shown being placed in proximity of the detection winding 2. If no object 4 is present within the proximity or detection area of the detection winding 2, a base inductance $L_0$ will be determined by the evaluation unit 3. If the object 4 is placed in the proximity of detection area of the detection winding 2, the inductance will change from the base inductance $L_0$ to a changed inductance $L_0+\Delta L$. The presence of the object 4 can e.g. be detected if the change of inductance $\Delta L$ is larger than a predetermined threshold value. It is also possible that the type of object can be detected depending on the change of inductance $\Delta L$. In this case it can e.g. be detected if the object is a diamagnetic object, e.g. consists of aluminum, copper, ferromagnetic iron and/or ferrite, etc.

Figure 2:
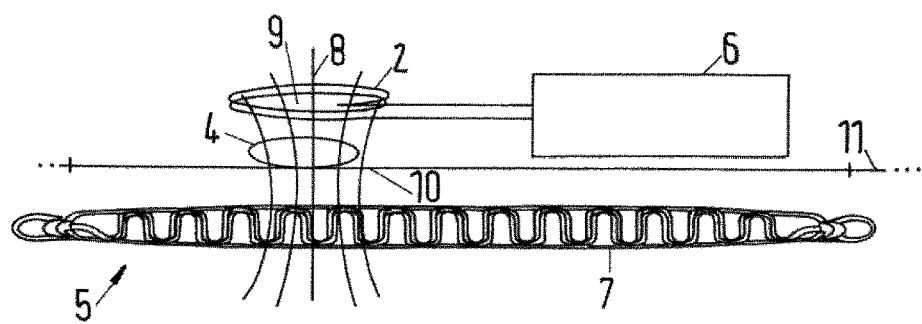

FIG. 2 shows a proposed safety system 5 in a first embodiment. The safety system 5 comprises a detection winding 2, a voltage sensor 6 and a primary winding structure 7 of a primary unit of a system for inductive power transfer to a vehicle (not shown). The primary winding structure 7 consists of three individual phase lines which extend in a meandering manner in a direction of travel of vehicles driving on the surface of the route 11 (longitudinal direction). In the embodiment shown, the primary winding structure 7 serves as an excitation winding which generates an alternating electromagnetic excitation field which is symbolized by field lines 8. It is shown that a magnetic flux extends through a detection surface 9 of the detection winding 2. The magnitude of the magnetic flux will change depending on the presence of an object 4 in the proximity of the detection winding 2. It is shown that the detection winding 2 is arranged such that the object 4, which is located on a charging surface 10 of the route 11 for the vehicle is located in between the excitation winding and the detection winding 2. The charging surface 10 of the route 11 is a subpart of the route surface. The primary winding structure 7 is located under the route surface. If the object 4 is placed on the charging surface 10, an output voltage of the detection winding 2 will change in comparison to a normal operating mode in which there is no object 4 placed on the surveillance surface 10. The change of the output voltage therefore indicates the presence of the object 4. The object 4 can be detected, if the change of the output voltage is higher than a predetermined threshold value. In FIG. 2, only one detection winding 2 of an array structure of detection windings 2 is shown for illustration purposes.

It is possible that the primary winding structure 7 can be operated at two frequencies. A first frequency can be an operating frequency if the primary winding structure 7 generates an electromagnetic field in order to transfer energy to a secondary unit of a vehicle (not shown). A second frequency can be a frequency in a detection mode, wherein the primary winding structure 7 generates the excitation field 8.

Figure 3:
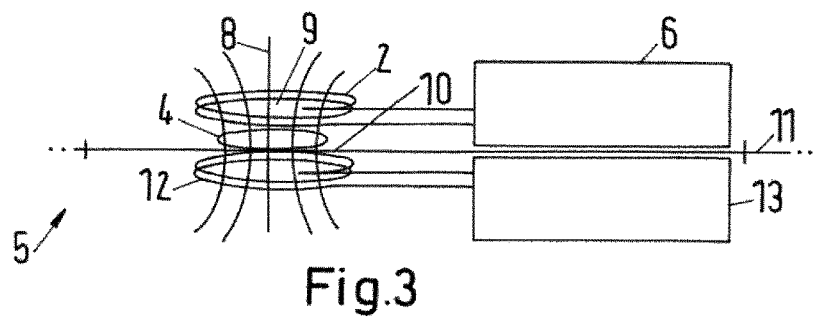

In FIG. 3, another embodiment of a proposed safety system 5 is shown. The safety system 5 comprises a detection winding 2 and an excitation winding 12 which is different from the primary winding structure 7 of the primary unit shown in FIG. 2. The excitation winding 12 is operated by a high frequency generator 13. Thus, the excitation winding 12 generates an alternating excitation field which is symbolized by field lines 8. In FIG. 3, the detection winding 2 is assigned to the excitation winding 12. This means that at least a part of a magnetic flux provided by the excitation field 8 generated by the excitation winding 12 extends through a detection surface 9 of the detection winding 2. If an object 4 is placed on a charging surface 10 of the route 11, an output voltage of the excitation winding 12 will change in comparison to a normal operating mode, where no object 4 is placed on the charging surface 10. The voltage sensor 6 detects the voltage change. The presence of the object 4 can therefore be detected depending on the change of the output voltage of the detection winding 2.

In FIG. 3, the charging surface 10 and thus the object 4 placed on the charging surface 10 is located in an interspace between the excitation winding 12 and the detection winding 2. The detection winding 2 can be arranged on a vehicle, in particular can be a part of a vehicle-sided secondary unit (not shown). As in FIG. 2, only one of multiple detection windings 2 and one excitation winding 12 is shown.

Figure 4:
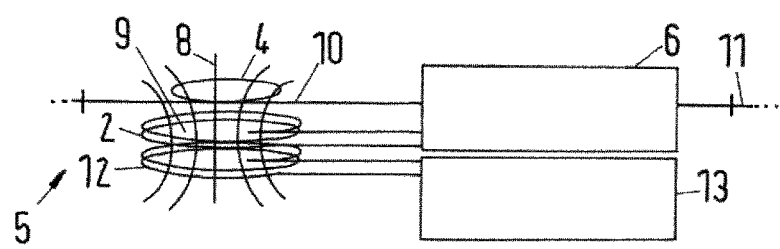

In FIG. 4, another embodiment of a proposed safety system 5 is shown. In contrast to the safety system 5 shown in FIG. 3, the safety system 5 shown in FIG. 4 is designed such that an object 4 located on a charging surface 10 of a route 11 is placed above an excitation winding 12 and above a detection winding 2. Both, the excitation winding 12 and the detection winding 2 are arranged under a surface of the route 11, wherein the object 4 is placed above or on the surface of the route 11. This advantageously allows a compact design of the safety system 5. As in FIG. 2, only one of multiple detection windings 2 and only one excitation winding 12 is shown.

Figure 5:
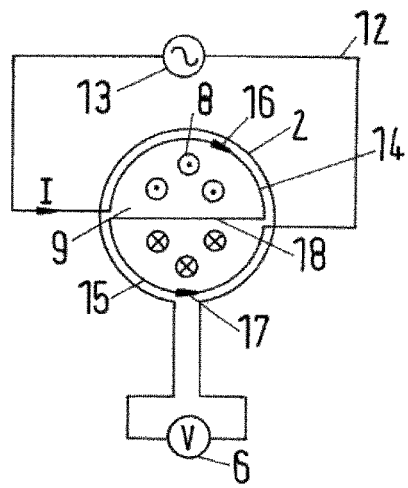

In FIG. 5, a schematic design of a detection winding 2 and an excitation winding 12 is shown. The detection winding 2 is a circular winding with a circular-shaped detection surface 9. The excitation winding 12 comprises a first half turn 14 and a second half turn 15. A radius of each of the half turns 14, 15 is smaller than the radius of the circular-shaped detection winding 2. The turning directions 16, 17 are opposite to each other. Both, the first half turn 14 and second half turn 15 are arranged concentric to a common central axis which is aligned with a central axis of the circular-shaped detection winding 2. If a current I flows through the first and the second half turn 14, 15, an excitation field symbolized by field lines 8 is generated. In particular, a flowing direction of the current I in the first half turn 14 (indicated by an arrow 16) is oriented clockwise with respect to the common central axis, wherein a flowing direction of the current in the second half turn 15 (indicated by arrow 17) is oriented counter-clockwise. In a normal operating mode, that means if not foreign object 4 (see FIG. 3) is placed in the proximity of the detection winding 2 (i.e. the surveillance area), the total magnetic flux through the detection surface 9 of the detection winding 2 is zero. The first and the second half turn 14, 15 are connected by a connecting line 18. If an object 4 is placed in the proximity of the detection winding 2, the magnetic flux extending through the detection surface 9 will deviate from zero. Thus, a non-zero voltage will be generated by the detection winding 2 which can be measured by a voltage sensor 6. Shown is also a high frequency generator 13 which generates the alternating current I.

Figure 6A:
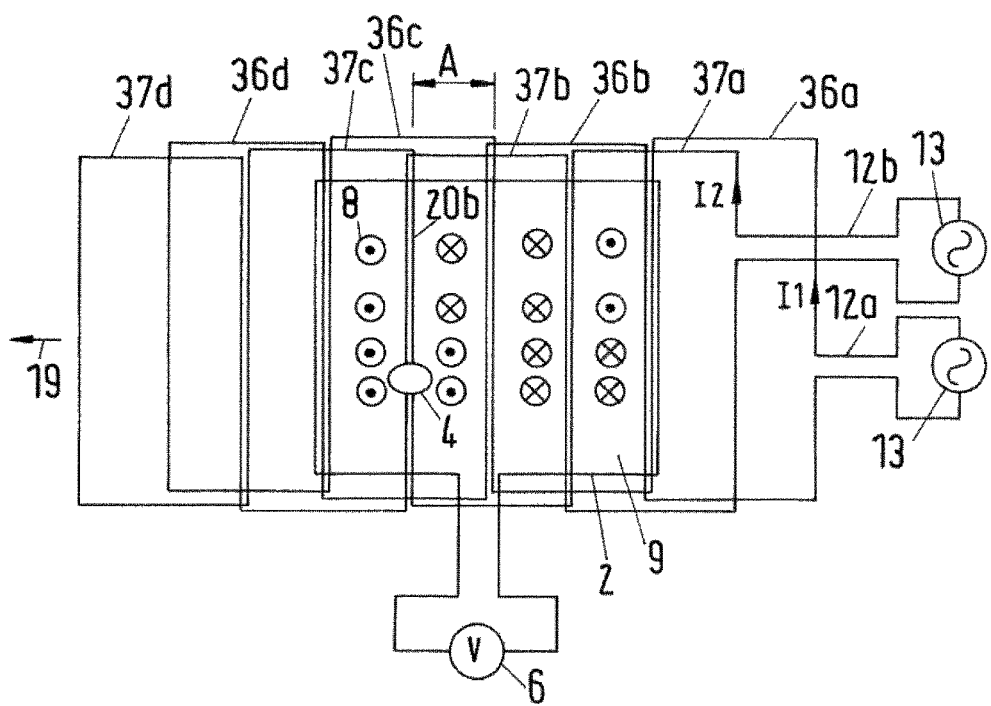

In FIG. 6a, a schematic design of a detection winding 2 and multiple excitation windings 12a, 12b is shown. The arrangement comprises a rectangular-shaped detection winding 2 enclosing a detection surface 9. A voltage sensor 6 is connected to connecting terminals of the detection winding 2. Furthermore, the arrangement comprises a first excitation winding 12a and a second excitation winding 12b which are operated by high frequency generators 13, respectively. It is, however, possible that the detection winding 2 and the excitation windings 12a, 12b can have another shape having an axis of symmetry.

The first excitation winding 12a comprises or provides an even number of consecutive, counter-oriented rectangular-shaped subwindings with identical dimensions, in this case four subwindings 36a, 36b, 36c, 36d, extending along a common central axis symbolized by an arrow 19. In this case, each subwinding 36a, 36b, 36c, 36d provides a pole. The consecutive subwindings 36a, 36b, 36c, 36d are connected such that a flowing direction of a current I1 in the uneven-numbered subwindings 36a, 36c corresponds to a counter-clockwise direction, wherein a flowing direction of a current I1 in the even-numbered subwindings 36b, 36d corresponds to a clockwise direction, wherein the clockwise direction is determined with respect to an axis perpendicular to the plane of projection and pointing towards a viewer.

The second excitation winding 12b is designed similar to the first excitation winding 12a but arranged with a displacement A along the central longitudinal axis 19. This means that also the second excitation winding 12b comprises or provides an even number of consecutive rectangular-shaped subwindings, in this case four counter-oriented subwindings 37a, 37b, 37c, 37d extending along the common central axis symbolized by the arrow 19.

It can be seen that the detection winding 2 and the excitation windings 12a, 12b are designed and arranged such that if the excitation windings 12a, 12b are projected into the plane of the detection surface 9 of the detection winding 2, the detection winding 2 encloses the second and the third subwinding 36b, 36c of the first excitation winding 12a and one half of the first subwinding 37a, the second subwinding 37b and one half of the third subwinding 37c of the second excitation winding 12b. Thus, the detection winding 2 encloses two poles of each excitation winding 12a, 12b.

Thus, a magnetic flux, represented by field lines 8, generated by the first excitation winding 12a extending through the detection surface 9 will be zero in a normal operating mode (no foreign object 4). Also, the magnetic flux, represented by field lines 8, generated by the second excitation winding 12b extending through the detection surface 9 will be zero in a normal operating mode.

By using two excitation windings 12a, 12b which are displaced with a displacement A, a higher detection sensitivity can be achieved. Considering the arrangement shown in FIG. 5, an object 4 placed symmetrically on the connecting line 18 will alter the magnetic flux through the area enclosed by the first half turn 14 and the connecting line 18 in the same way as the magnetic flux through the area enclosed by the second half turn 15 and the connecting line 18. If a foreign object 4 is placed symmetrically on a connecting section 20b of e.g. the second subwinding 37b and the third subwinding 37c of the second excitation winding 12b, the object 4 will alter the magnetic flux generated by a flow of a current I2 through the two neighboring subwindings 37b, 37c of the second excitation winding 12b in the same way. In such a configuration, the magnetic flux generated by the second and the third subwinding 37b, 37c will be altered similarly.

Because of the displacement, however, the object 4 will alter the magnetic flux of the third subwinding 36c of the first excitation winding 12a differently from the magnetic flux of the second subwinding 36b, as these subwindings 36a, 36b are displaced with a displacement A with respect to the subwindings 37b, 37c of the second excitation winding 12b. Such an arrangement increases the robustness of detection.

The displacement A can be chosen such that the first and the second excitation windings 12a, 12b are magnetically decoupled and their high frequency generators 13 can be operated independently from each other. Another option is to operate the high frequency generators 13 in a cyclic operating mode, wherein either the high frequency generator 13 of the first excitation winding 12a or the high frequency generator 13 of the second excitation winding 12b is operated in order to ensure a magnetic decoupling. It is also possible to connect the first and the second excitation winding 12a, 12b in series. The decoupling would still help in that case to reduce the impedance of the excitation windings 12a, 12b to limit the generator voltage.

Thus, an arrangement of at least two excitation windings 12a, 12b is shown, wherein each excitation winding 12a, 12b comprises at least two subwindings extending along a common central axis 19, wherein the subwindings are designed and connected such that a direction of a current flowing through a subwinding is oppositely oriented to a direction of a current flowing through a consecutive subwinding, wherein corresponding subwindings of the two excitation windings 12a, 12b are spaced apart with a displacement A along the common central axis 19. The common central axis 19 is perpendicular to the central axes of the subwindings. The displacement A can be chosen equal to or larger than a dimension, i.e. a diameter of the smallest object 4 which is to be detected. Alternatively or in addition, the displacement A can be chosen such that a magnetic coupling between the excitation windings 12a, 12b is smaller than a predetermined value, preferably zero and/or such that a minimal mutual inductance between the excitation windings 12a, 12b is provided. This means that there is no or only a minimal energy transfer between the respective excitation windings 12a, 12b.

Figure 6B:
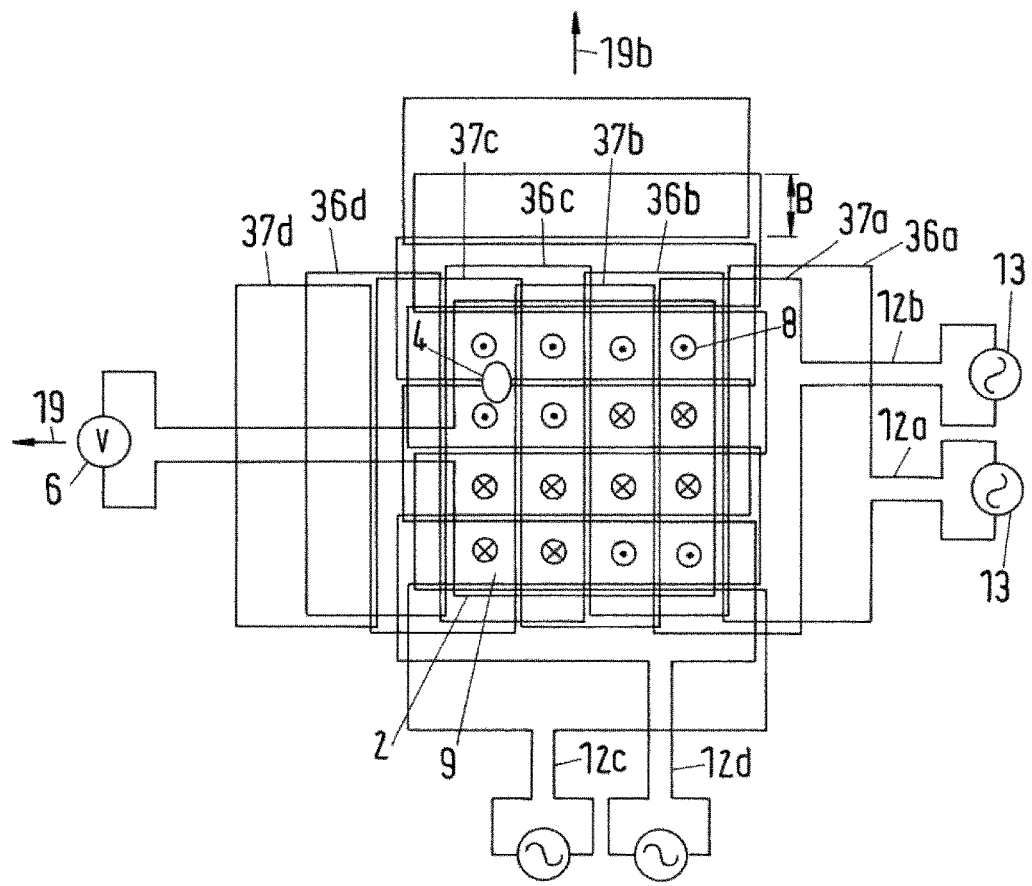

In FIG. 6b, another schematic design of a detection winding 2 and multiple excitation windings 12a, 12b, 12c, 12d is shown. In contrast to the design shown in FIG. 6a, two additional excitation windings 12c, 12d are provided. These additional excitation windings 12c, 12d are designed similar to the excitation windings 12a, 12b, in particular with a displacement B along a common central axis 19b. The displacement B can be equal to or different from the displacement A. The common central axis 19b, however, is oriented with a predetermined angle with respect to the common central axis 19 of the excitations windings 12a, 12b, in particular perpendicular to the common central axis 19 of the excitations windings 12a, 12b. This further increases a detection sensitivity.

Thus, an arrangement of at least four excitation windings 12a, 12b, 12c, 12d is shown, wherein each excitation winding 12a, 12b, 12c, 12d comprises at least two subwindings. The subwindings of a set of two excitations windings 12a, 12b extend along a first common central axis 19, wherein the subwindings are designed and connected such that a direction of a current flowing through a subwinding is oppositely oriented to a direction of a current flowing through a consecutive subwinding, wherein corresponding subwindings of the two excitation windings 12a, 12b are spaced apart with a first displacement A along the first common central axis 19. The subwindings of another set of two excitations windings 12c, 12d extend along a second common central axis 19b, wherein the subwindings are designed and connected such that a direction of a current flowing through a subwinding is oppositely oriented to a direction of a current flowing through a consecutive subwinding, wherein corresponding subwindings of the two excitation windings 12c, 12d are spaced apart with a second displacement B along the second common central axis 19b which encloses a predetermined angle with the first common central axis 19.

Thus, a configuration is provided, wherein the number of balanced configurations is minimized. In this context, "balanced configuration" means that a magnetic flux generated by the excitation windings 12a, 12b, 12c, 12d which extends through the detection surface 9 of the detection winding 2 is zero although a foreign object 4 is located in the surveillance area, e.g. in the proximity of the detection winding 2 and/or the excitation windings 12a, 12b, 12c, 12d.

It is, of course, possible to provide more than two subwindings per excitation winding and/or more than two excitation windings extending along a common central axis and/or more than two sets of excitation windings which extend along different common central axes.

In FIG. 5, in FIG. 6a and in FIG. 6b it is shown, that a diameter or a geometric size of the detection winding 2 is larger than a diameter or geometric size of the subwindings 36a, 36b, 36c, 36d, 37a, 37b, 37c, 37d provided by the excitation windings 12a, 12b, 12c, 12d or sections of the excitation windings 12a, 12b. However, it is possible that a diameter or geometric size of the subwindings 36a, 36b, 36c, 36d, 37a, 37b, 37c, 37d provided by the excitation winding(s) 12a, 12b, 12c, 12d is larger than a diameter or geometric size of the detection winding 2. In this case, only a part of the magnetic flux generated by the excitation winding(s) 12a, 12b will extend through the detection surface 9. This will decrease a detection sensitivity. In this case, the detection sensitivity can be increased by increasing the number of subwindings 36a, 36b, 36c, 36d, 37a, 37b, 37c, 37d of the detection winding 2.

In another embodiment it is also possible that only one excitation winding with one subwinding is used, wherein a diameter or geometric size of the subwinding is larger than a diameter or geometric size of the detection winding 2. This will lead to a smaller voltage induced in the detection winding. In this case, a winding number of the detection winding 2 can be chosen higher than a predetermined value in order to increase the sensitivity of detection.

Figure 7:
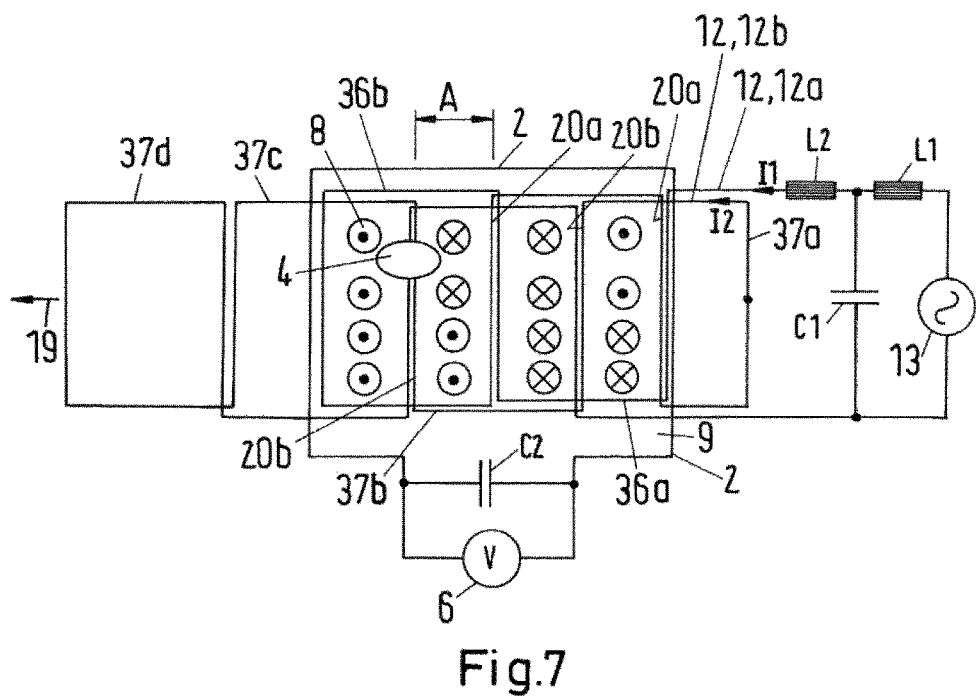

In FIG. 7, another schematic design of a detection winding 2 and multiple excitation windings 12a, 12b is shown. The difference to the design shown in FIG. 6a is that the first excitation winding 12a is connected in series to the second excitation winding 12b. Also, the first excitation winding 12a comprises only two consecutive, counter-oriented subwindings 36a, 36b wherein the second excitation winding 12b comprises four consecutive counter-oriented subwindings 37a, 37b, 37c, 37d. The currents I1, I2 which are fed to the excitation windings 12a, 12b are provided by a constant current source. The constant current source comprises the voltage source 13, a first inductive element L1, a second inductive element L2, and a capacitive element C1. The first and the second inductive elements L1, L2 are connected in series to the voltage source 13, wherein the capacitive element C1 is connected in parallel to the series connection of the first inductive element L1 and the voltage source 13.

Due to the even number of poles of the excitation windings 12, 12a, 12b which are provided by the even number of subwindings 36a, 36b, 37a, 37b, 37c, 37d, the previously described total field 24 (see FIG. 10) will not alter or influence the operational characteristics of the constant current source. If no metal object 4 is located in the proximity of the excitation windings 12, 12a, 12b, the voltage induced in the detection winding 2 will be zero due to the design and arrangement of the excitation windings 12, 12a, 12b (as explained with respect to FIG. 6a).

In FIG. 7 it is shown that a second capacitive element C2 is connected in parallel to the detection winding 2. If a voltage is induced in the detection winding 2, a relatively high resonant current will flow through the detection winding 2 as the second capacitive element C2 provides a low impedance at the frequency of the induced voltage. This resonant current generates a voltage falling across the second capacitive element C2, wherein an amplitude of said voltage is proportional to the resonant current. This provides a high detection sensitivity of the shown design.

In the embodiments shown in FIGS. 6a, 6b, 7, the number of turns of each subwinding 36a, 36b, 36c, 36d, 37a, 37b, 37c, 37d can be equal to one or larger than one.

Figure 8:
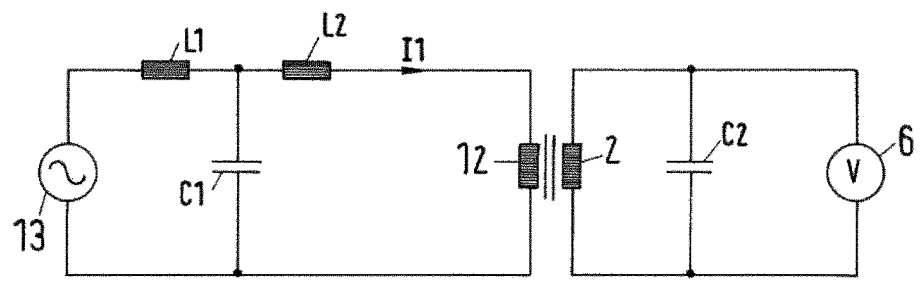

FIG. 8 shows an equivalent circuit of the design shown in FIG. 7. The design shown in FIG. 8 provides a current transformer, wherein an input current I1 is constant and the output circuit provides a current source. The detection winding 2 is operated in a parallel resonant mode.

Figure 9:
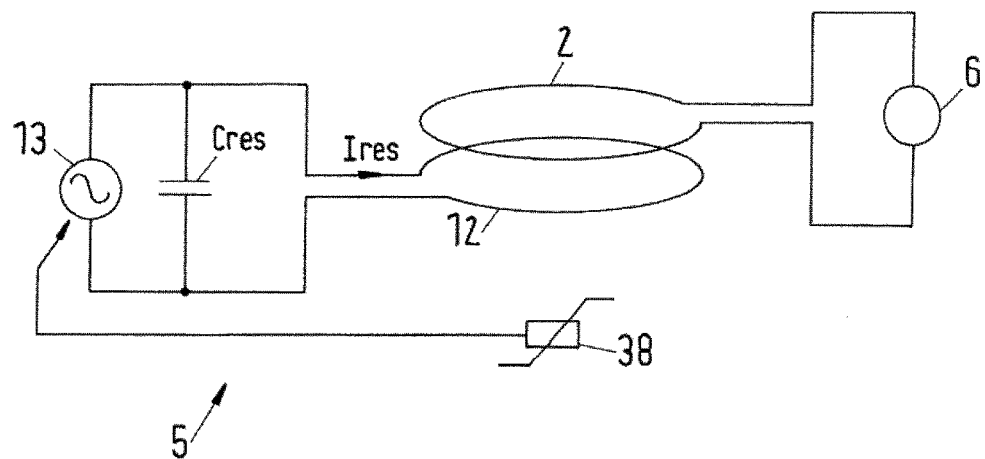

FIG. 9 shows a schematic diagram of the proposed safety system 5 in a fourth embodiment. A voltage generator 13 is operated at the resonant frequency of an oscillating circuit, wherein losses of the oscillating circuit are compensated by the voltage source 13. The oscillating circuit is provided by a resonant capacitive element Cres and an excitation winding 12. The elements of the oscillating circuit are designed such that the oscillating circuit provides an infinite impedance with respect to the voltage source 13.

Within the oscillating circuit, a resonant current Ires flows. This resonant current Ires generates an excitation field which is received by the detection winding 2, wherein the detection winding 2 generates a relatively high voltage which can be detected by a voltage sensor 6. If a foreign object (not shown) is placed within the proximity of the excitation winding 12, the oscillating circuit is detuned. In this case, the resonant frequency of the oscillating circuit does not match the operating frequency of the voltage source 13.

Figure 10:
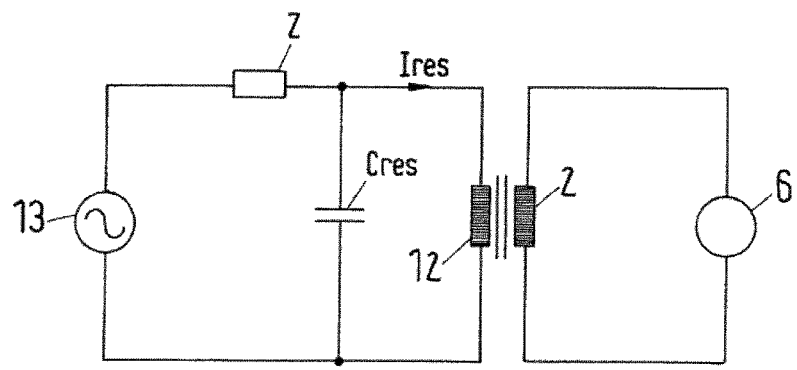

As seen in FIG. 10, which shows an equivalent circuit of the design shown in FIG. 9, the oscillating circuit is coupled to the voltage generator 13 by an element Z, wherein an impedance of the element Z is higher, e.g. 1000 times higher, than the impedance provided by the oscillating circuit or the impedance of the excitation winding 12. Thus, the oscillating circuit is decoupled from the voltage source 13.

As a result of the decoupling, the resonant current Ires will decrease significantly if the oscillating circuit is detuned. This will decrease a magnitude of the excitation field which, in turn, will result in a voltage drop of the voltage induced in the detection winding 2. Depending on the voltage course detected by the voltage sensor 6, the presence of the foreign object in the proximity of the excitation winding 12 can be detected. Such a design provides a high detection sensitivity and an increased robustness of detection.

The decoupling of the detection from the primary field or total field can be achieved by choosing the resonant frequency of the oscillating circuit different from the operating frequency of the primary field or total field.

To enhance stability of the operation of the oscillating circuit, a temperature can be measured by a temperature sensor 38, wherein the operating frequency of the voltage generator 13 is adapted to the measured temperature.

The excitation winding 12 and/or the detection winding 2 can have an arbitrary design or shape. It is, however, of advantage that the excitation winding 12 and/or the detection winding 2 provide a single pole, e.g. provide only one subwinding. In this case, the excitation winding 12 and the detection winding 2 can be designed equally and arranged such that their axes of symmetry correspond to each other. A number of turns of the excitation winding 12 can be chosen different from, in particular smaller than, a number of turns of the detection winding 2.

Figure 11:
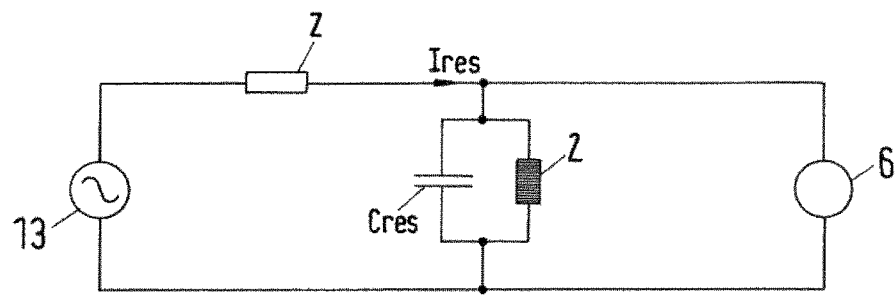

FIG. 11 shows a schematic diagram of the proposed safety system 5 in a fifth embodiment. In this case, the detection winding 2 is part of an LC oscillating circuit. As shown in FIG. 9, a voltage generator 13 is operated at the resonant frequency of the oscillating circuit, wherein losses of the oscillating circuit are compensated by the voltage source 13. The oscillating circuit is provided by a resonant capacitive element Cres and the detection winding 2. Again, the elements of the oscillating circuit are designed such that the oscillating circuit provides an infinite impedance with respect to the voltage source 13. Within the oscillating circuit, a resonant current Ires flows. This resonant current Ires generates a voltage falling across the parallel connection of the capacitive element Cres and the detection winding 2. If a foreign object (not shown) is placed within the proximity of the detection winding 2, the oscillating circuit is detuned. In this case, the resonant frequency of the oscillating circuit does not match the operating frequency of the voltage source 13.

The oscillating circuit is coupled to the voltage generator 13 by an element Z, wherein an impedance of the element Z is higher, e.g. 1000 times higher, than the impedance provided by the oscillating circuit or the impedance of the detection winding 2. Thus, the oscillating circuit is decoupled from the voltage source 13.

As a result of the decoupling, the resonant current Ires will decrease significantly if the oscillating circuit is detuned. This will, in turn, result in a voltage drop of the voltage falling across the aforementioned parallel connection. Depending on the voltage course detected by the voltage sensor 6, the presence of the foreign object in the proximity of the detection winding 2 can be detected. Such a design provides a high detection sensitivity and an increased robustness of detection.

Figure 12:
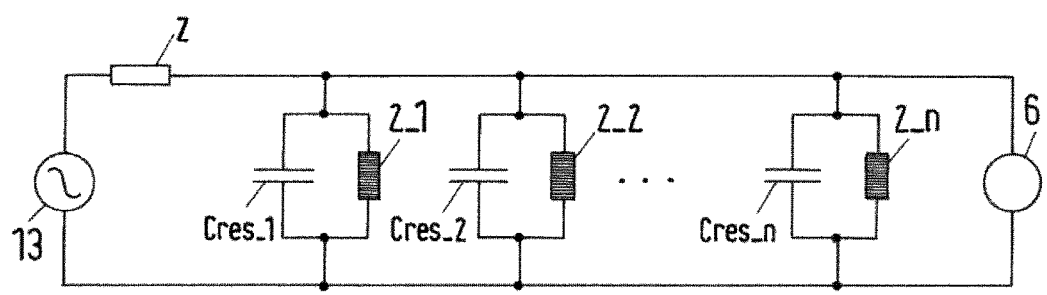

FIG. 12 shows a schematic diagram of the proposed safety system 5 in a sixth embodiment. The safety system 5 comprises n oscillating circuits which are connected in parallel, wherein only one voltage sensor 6 is used in order to measure the voltage falling across the parallel connection of all oscillating circuits. Each oscillating circuit comprises a capacitive element Cres_1, Cres_2, Cres_n and a detection winding 2_1, 2_2, 2_n which provides the inductive element. The detection sensitivity of the shown safety system 5 depends on the number n of parallel connected oscillating circuits. A higher number n of oscillating circuits decreases the detection sensitivity. It is, however, possible to adjust the detection sensitivity by tuning the impedance of the element Z. The impedance of the element Z, for example, can be increased until a voltage falling across the parallel connection of all LC oscillating circuits reaches a minimal value, wherein the minimal value represents a voltage value which can be measured with a desired precision.

An important property of the safety system 5 shown in FIG. 12 is a self-surveillance function. If one element of one oscillating circuit, e.g. a capacitive element Cres_1, Cres_2, Cres_n or a detection winding 2_1, 2_2, 2_n, is defective, e.g. provides a short circuit, the voltage measured by the voltage sensor 6 will break down.

Figure 12A:
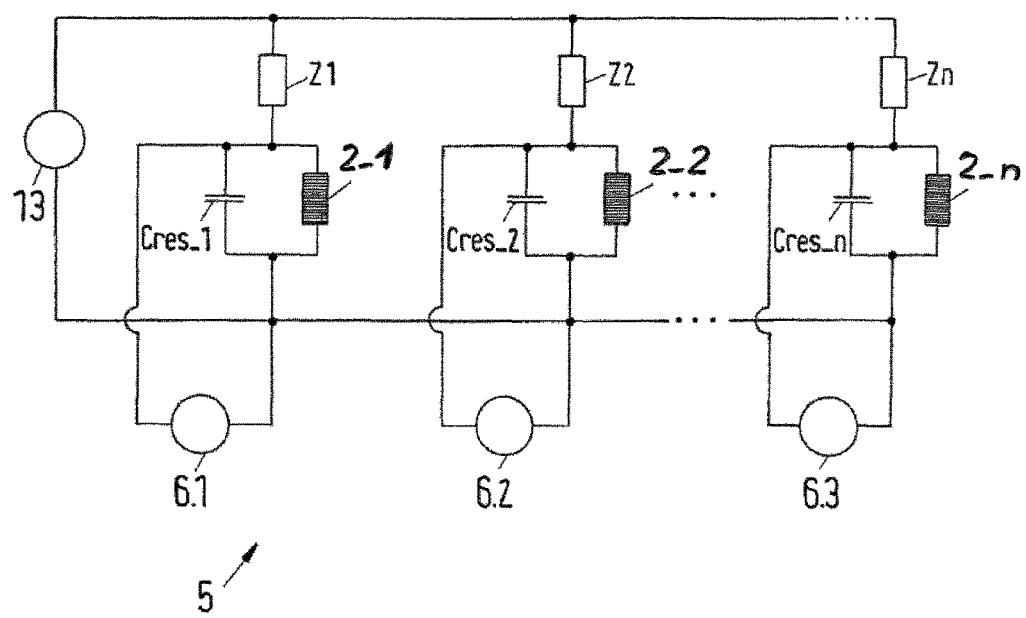

FIG. 12a shows a schematic diagram of the proposed safety system 5 in a seventh embodiment. The safety system 5 is designed as the safety system 5 shown in FIG. 12, wherein, the safety system 5 comprises n series connections of a an element Z1, Z2, . . . , Zn with a predetermined impedance and an oscillating circuit, wherein said series connections are connected in parallel. However, the safety system 5 comprises n voltage sensors 6_1, 6_2, . . . , 6_n, wherein each voltage sensor 6_1, 6_2, . . . , 6_n measures the voltage falling across one oscillating circuit. In this case, the safety system 5 comprises only one single voltage source 13 per array of parallel connections. Using n voltage sensors 6_1, 6_2, . . . , 6_n advantageously allows, however, detecting or estimating a position where a foreign object 4 (see e.g. FIG. 1) is located as the object will only detune one or a small number of oscillating circuits. Consequently, the resulting voltage drop will be detected by the corresponding voltage sensor(s) 6_1, 6_2, . . . , 6_n. Each voltage sensor 6_1, 6_2, . . . , 6_n can be provided by a individual measurement channel of a common voltage sensor.

Figure 13:
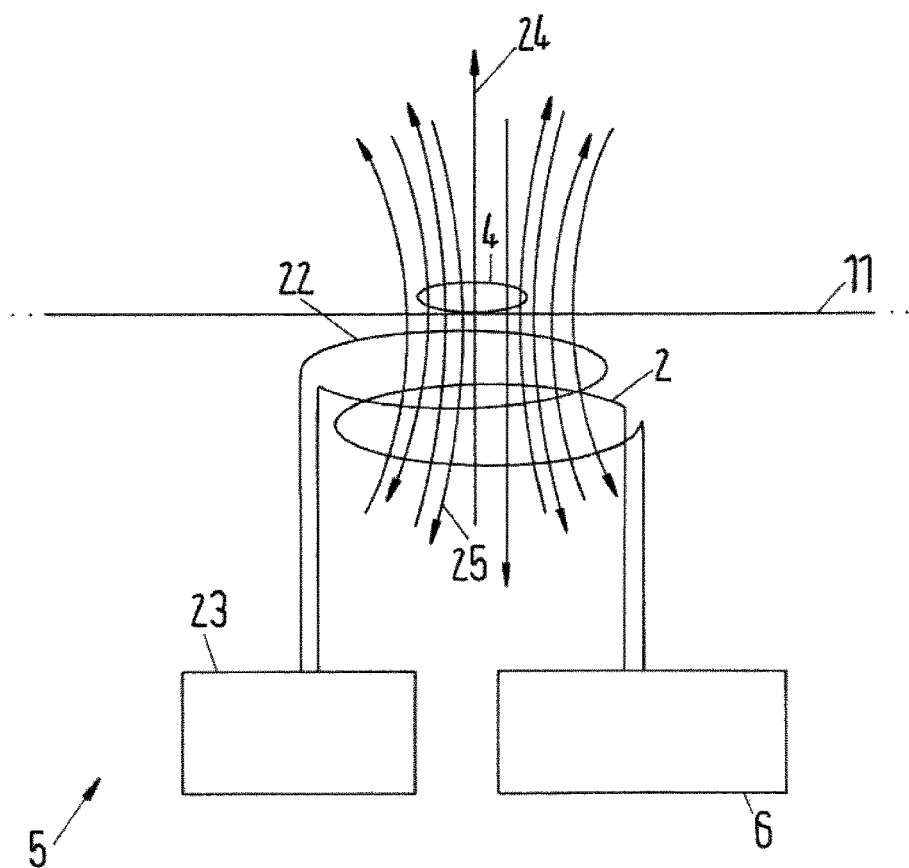

In FIG. 13, another embodiment of the proposed safety system 5 is shown. The safety system 5 comprises multiple detection windings 2 and an excitation winding, which is not shown in FIG. 13. Further, the safety system 5 comprises at least one cancellation winding 22. Also shown is a voltage source 23 which operates the cancellation winding 22. Also shown is an object 4 placed in the proximity of the detection winding 2 on the surface of a route 11. For illustration purposes, only one detection winding 2 is shown. The cancellation winding 22 is designed and arranged such that a total field shown by field lines 24 is cancelled by a cancellation field shown by field lines 25 generated by the cancellation winding 22 in a subarea of the surface of the route 11. After the object 4 is detected by means of the detection winding 2, an area of location can be determined based e.g. on a specific identifier of the detection winding 2. Then, a cancellation winding 22 assigned to the entire charging surface 10 (see FIG. 2) or to the respective detection winding 2 can be operated by the voltage source 23 such that the total field 24 can be cancelled or reduced at least within the area of location, preferably only within the area of location. In particular, the voltage source 23 operates the cancellation winding 22 such that an alternating electromagnetic field is generated which has the magnitude of the total field but is oriented in a direction opposite to a direction of the total field 24. This advantageously allows local cancellation or reduction of the total field 24 and thus reduces heating of the object 4.

Figure 14:
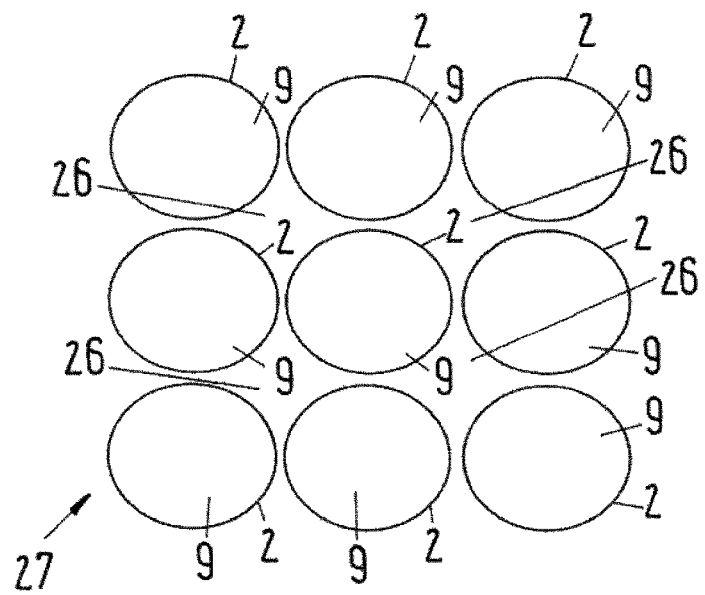

In FIG. 14, an array structure 27 of detection windings 2 is shown. The detection windings 2 are all circular-shaped, each providing a detection surface 9. It is shown that the detection windings 2 next to each other have no overlap of the detection areas 9. In this case, interspaces 26 between the circular-shaped detection windings exist. Such an arrangement provides a high sensitivity of detection if an object 4 (see FIG. 2) is placed at least partly over a detection area 9 of a detection winding 2. If, however, an object 4 is placed over an interspace 26, such an object may not be detected or a sensitivity of detection is decreased.

Figure 15:
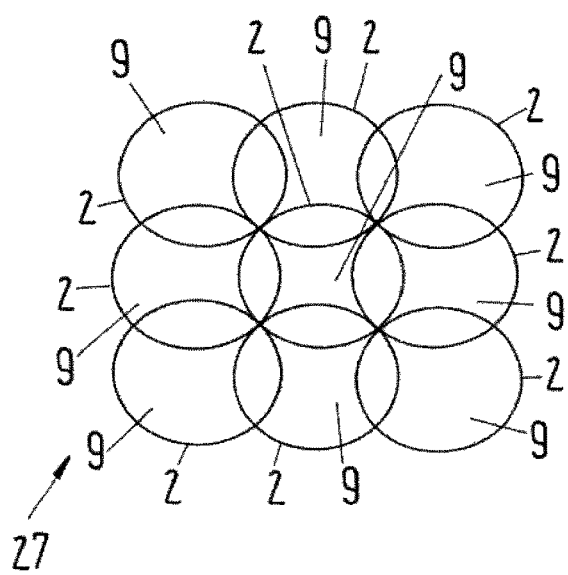

In FIG. 15, another array structure 27 of circular-shaped detection windings 2 having a circular-shaped detection area 9 is shown. In this case it is shown that the detection windings 2 are arranged such that detection areas 9 of different detection windings 2, in particular neighboring detection windings 2, overlap such that there are no interspaces 26 (see FIG. 14). This increases a coverage of a desired surveillance area while providing a high sensitivity. However, a large number of detection windings 2 have to be used.

Figure 16:
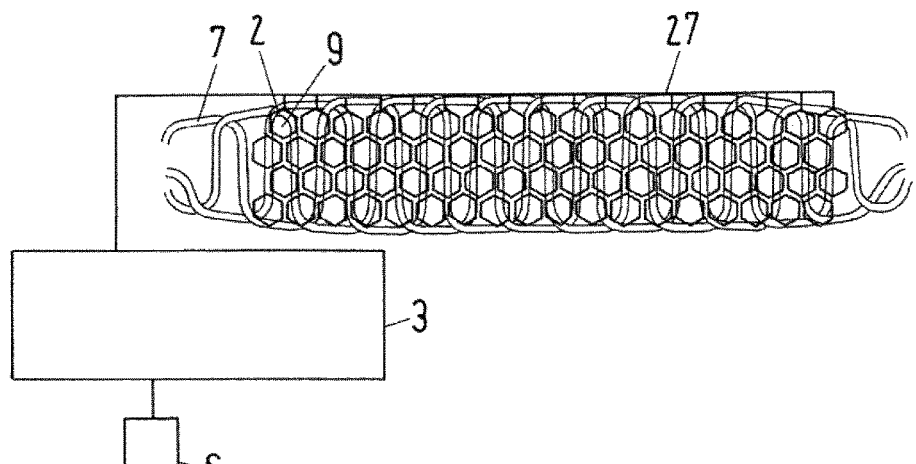

In FIG. 16, an array structure 27 of hexagonal-shaped detection windings 2 is shown. Also shown is a primary winding structure 7 which is arranged underneath the array structure 27 of hexagonal-shaped detection windings 2. These detection windings 2 also provide detection surfaces 9 which are hexagonal-shaped. For illustration purposes, only one hexagonal-shaped detection winding 2 and one detection surface 9 is denoted by a reference numeral. The shown array structure 27 advantageously provides a high coverage of a desired charging surface or surveillance area located above or over the primary winding structure 7 with a high sensitivity while an amount of detection windings 2 is reduced. To achieve this, the hexagonal-shaped detection windings 2 are arranged such that a honeycomb arrangement is provided. This means, that an edge of hexagonal-shaped detection winding 2 is arranged parallel to an edge of a neighboring hexagonal-shaped detection winding 2, wherein a displacement between the two neighboring edges is minimized. The hexagonal-shaped detection winding 2 advantageously provides a constant or nearly constant detection sensitivity across the total detection surface 9 of such a detection winding 2.

Multiple detection windings 2 of the array structure 27 can form a group of detection windings 2. Thus, multiple detection windings 2 can be arranged in subgroups, wherein the safety system 5 comprises one connecting means per subgroup, wherein each detection winding 2 of a subgroup is connectable to an evaluation unit, e.g. a voltage sensor 6, via the respective connecting means. The connecting means can be e.g. a de-multiplexing unit 3. Via such a unit 3, each detection winding 2 of a subgroup can be connected to one evaluation unit. This advantageously allows using only one evaluation unit for the array structure 27 of detection windings 2.

Figure 17:
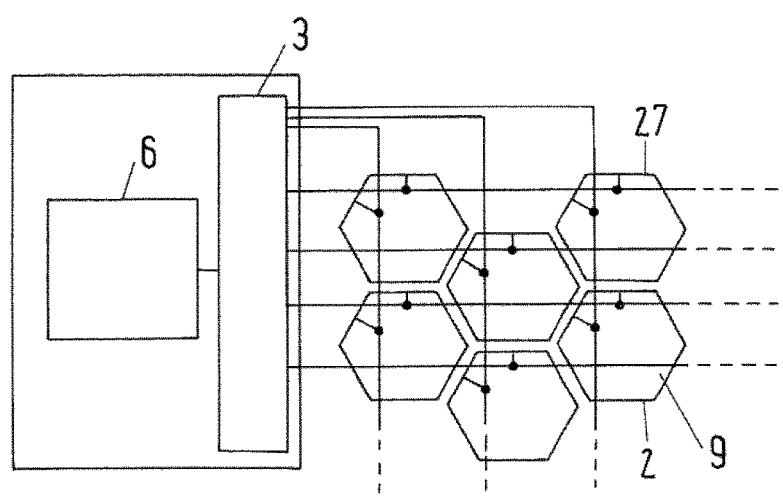

Another option is shown in FIG. 17. FIG. 17 shows a detailed view of an arrangement 27 of hexagonal-shaped detection windings 2 with a hexagonal-shaped detection surface 9. The detection windings 2 are arranged in a matrix-like structure, wherein the safety system comprises a first connecting means which is assigned to the sequence of rows of the matrix-like structure, and a second connecting means, which is assigned to the sequence of columns of the matrix-like structure. The first and second connecting means can be provided by a de-multiplexing unit 3. Via the first and the second connecting means, each of the detection windings 2 of the array structure 27 is connectable to an evaluation unit, e.g. a voltage sensor 6. In this case, a first connecting terminal of a detection winding 2 can be connectable to the first connecting means, wherein a second connecting terminal of the detection winding 2 can be connectable to the second connecting means.

Figure 18:
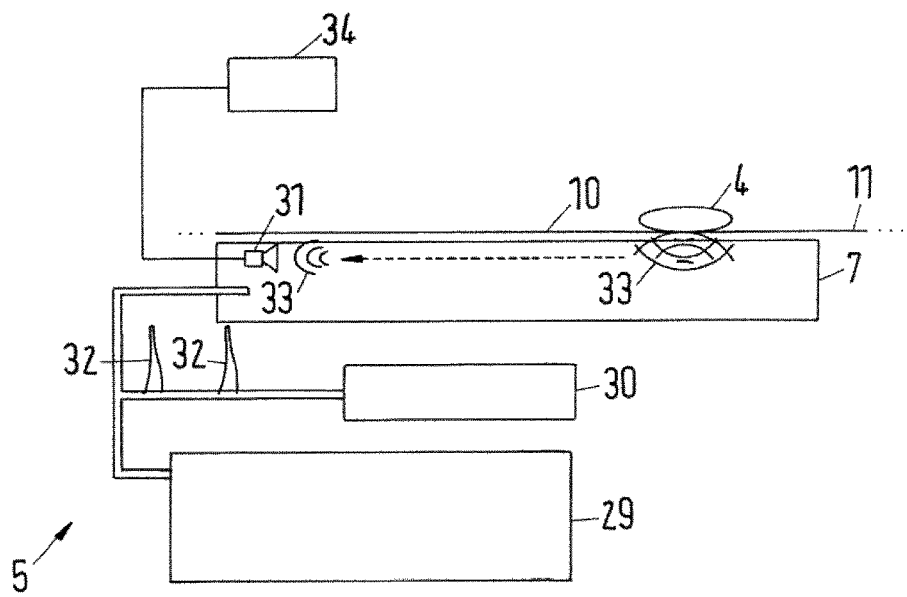

In FIG. 18, another embodiment of a proposed safety system 5 is shown. The safety system 5 comprises a wayside power converter 29, an impulse generator 30, a primary winding structure 7 and a detection winding 2 (see FIG. 2), which is not shown in FIG. 18. Furthermore, the safety system 5 comprises an acoustic sensor 31, e.g. a microphone. The impulse generator 30 is electrically connected to the primary winding structure 7. Also, the wayside power converter 29 is electrically connected to the primary winding structure 7. The impulse generator 30 can generate an impulse 32 which, in turn, generates an electromagnetic field via the primary winding structure 7. The electromagnetic field generated by the impulses 32 can create eddy currents in a metallic object 4 placed on the charging surface 10 of the route 11. These eddy currents interact with an electromagnetic field, which can either be the electromagnetic field generated by the impulses 32 or another electromagnetic field generated by signals of the wayside power converter 29. The resulting Lorentz forces will cause the metallic object 4 to vibrate and to create sound waves symbolized by wave lines 33. The sound waves 33 will be received by the acoustic sensor 31. An evaluation unit 34 evaluates the sound waves 33 and depending on the received sound waves 33, the presence of the object 4 can be detected. This advantageously provides a redundancy of detection.

It is possible, that the proposed sound-based system prevents an independent invention. In this case, the safety system comprises an impulse generator, means for generating an excitation field, e.g. an excitation winding, and an acoustic sensor and an evaluation unit.

Figure 19:
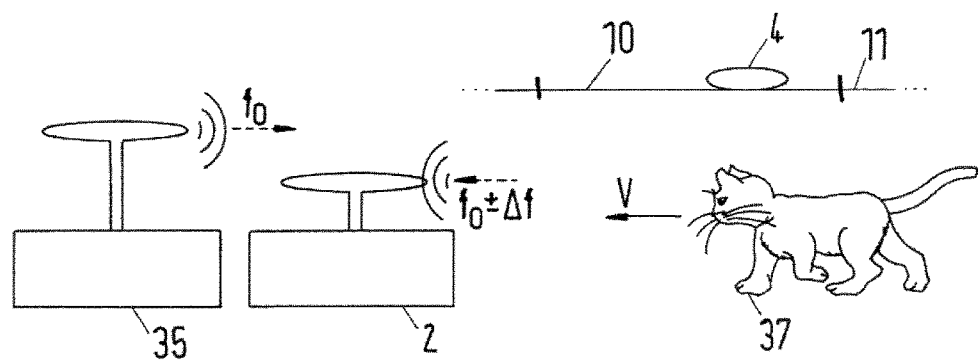

In FIG. 19, a further extension of the proposed safety system 5 is shown. In this case, the safety system 5 comprises a microwave transmitter 35 and a detection winding 2 designed as a microwave receiver. The microwave receiver 35 and the receiver 2 are arranged with respect to the surface of the route 11 such that an object 4 placed on the charging surface 10 of the route 11 can be detected. By using a microwave-based approach, moving objects 37 can be detected. It is shown that the microwave transmitter 35 generates signals with the operating frequency $f_0$. If a moving object 37 moves on the surface of the route 11, the reflected wave signals will have a frequency depending on the velocity v of the moving object 37. Based on the Doppler effect, a moving object 37 can be detected. If the microwave transmitter is operated by or comprises an LC generator which generates the microwaves, the operating frequency of the LC generator can be detuned due to a stationary metal object 4 located within the proximity of the LC generator. In this case, the waves received by the detection winding 2 will have frequency depending on the amount of detuning which, in turn, depends on the change of the inductivity of the LC generator by the foreign metal object 4. Based on the changed frequency, a stationary metal object 4 can be detected. It is possible that the change of the frequency caused by a moving object 37 is similar to the change of frequency due to a stationary metal object 4. In this case, an additional criterion needs to be evaluated in order to identify a moving or a stationary object 37, 4. For example it can be determined if the change of frequency is constant or almost constant for a predetermined time period. If this is the case, a stationary object 4 can be identified since a moving object 37 will most preferably have left the detection range of the microwave transmitter-receiver configuration within the time period.

Figure 20:
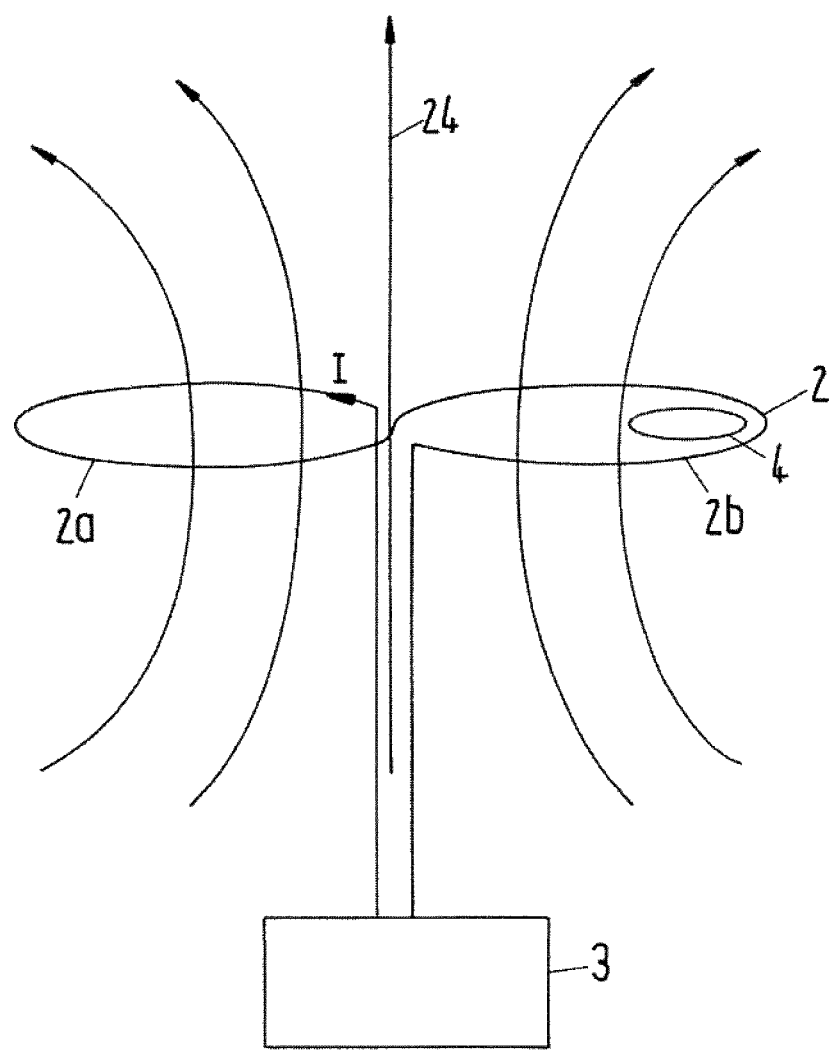

In FIG. 20, a schematic diagram of a detection winding 2 designed as a primary field or total field compensating winding 2 is shown. The detection winding 2 is designed such that a total field shown by arrows 24 is compensated for. The detection winding 2 comprises a first subwinding 2a, and a second subwinding 2b. In general, the detection winding 2 should be designed such that an even number of poles, which can e.g. be provided by one subwinding 2a, 2b, is provided. The first and the second subwinding 2a, 2b are arranged and connected such that a current I, which flows through the subwindings 2a, 2b, flows in a first turning direction, e.g. a counter-clockwise direction, through subwinding 2a and in a second turning direction, e.g. a clockwise direction, through the second subwinding 2b, wherein the first turning direction is opposite to the second turning direction. In total, the detection winding 2 is 8-shaped. If the total field 24 is almost homogeneous and extends through areas enclosed by the first and the second subwinding 2a, 2b, the voltages induced in the first subwinding 2a and the second subwinding 2b have the same magnitude but an opposite sign. Thus, the total voltage induced in the detection winding 2 by the total field 24 is zero or nearly zero, at least at the operating frequency of the total field. Thus, the effect of the total field on the inductive sensing system and on the detection sensitivity is minimized. An object 4 (see FIG. 1) placed in the proximity of either the first or the second subwinding 2a, 2b can therefore be detected depending on the change of the base inductance $L_0$ of the detection winding 2 even if a total field 24 exists. Shown is also an evaluation unit 3 which is able to evaluate an inductance of the detection winding 2. As described previously, this design can also be applied to an excitation winding 12a, 12b (see e.g. FIG. 6a).

The invention claimed is:

1. A safety system for an inductive power transfer system for transferring power to a vehicle on a surface of a route, comprising:
  a primary unit of at least one primary winding for generating an electromagnetic primary field for the inductive power transfer,
  a charging surface of the route assigned to the primary winding, and
  at least one inductive sensing system, wherein the inductive sensing system comprises multiple detection windings, wherein
  the multiple detection windings are arranged in an array structure, wherein the array structure covers the charging surface at least partially, and wherein the inductive sensing system comprises at least one excitation winding for generating an excitation field which is received by at least one of the multiple detection windings.

2. The safety system of claim 1, wherein a detection winding of the multiple detection windings is part of an LC oscillating circuit.

3. The safety system of claim 2, wherein a predetermined number of LC oscillating circuits are connected parallel to each other, wherein an inductive element of each LC oscillating circuit is at least partially provided by one detection winding.

4. The safety system of claim 1, wherein the inductive sensing system is designed as a primary field or total field compensating sensing system and each detection winding is designed as a primary field or total field compensating winding.

5. The safety system of claim 4, wherein at least one of the detection windings comprises an even number of counter-oriented subwindings.

6. The safety system according to claim 1, wherein the at least one excitation winding is part of a LC oscillating circuit.

7. The safety system according to claim 6, wherein the at least one excitation winding and the detection windings are arranged such that a foreign object located on or in a proximity of the charging surface is arranged in between the at least one excitation winding and the detection windings.

8. The safety system according to claim 6, wherein the at least one excitation winding and the detection windings are arranged such that a foreign object located on or in a proximity of the charging surface is arranged above the at least one excitation winding and above the detection windings.

9. The safety system according to claim 6, wherein at least one excitation winding is provided by the primary winding.

10. The safety system according to claim 6, wherein the at least one excitation winding is provided by a winding structure different from the primary winding.

11. The safety system according to claim 10, wherein the at least one excitation winding is designed and arranged such that an excitation field is generated such that a magnetic flux received by corresponding detection winding(s) is zero in a normal operating mode.

12. The safety system according to claim 11, wherein the at least one excitation winding is designed such that an even number of poles is provided, wherein the at least one excitation winding and a corresponding detection winding are arranged and/or designed such that the magnetic flux generated by different poles extends through the detection surface of the detection winding.

13. The safety system according to claim 1, wherein the safety system comprises an acoustic sensor and a current impulse generating means.

14. The safety system according to claim 1, wherein the safety system comprises a microwave transmitting device and a microwave receiving device.

15. The safety system according to claim 14, wherein at least one of the detection windings is designed as the microwave receiving device and one excitation winding is designed as the microwave transmitting device.

16. The safety system according to claim 1, wherein the detection windings are designed as circular detection windings.

17. The safety system according to claim 16, wherein the circular detection surfaces of at least two circular detection windings at least partly overlap.

18. The safety system according to claim 1, wherein the detection windings are designed as hexagonal-shaped or rectangular-shaped detection windings.

19. The safety system according to claim 1, wherein the safety system comprises at least one primary field or total field cancellation means for generating a cancellation field, wherein the cancellation means is designed and/or arranged such that the primary field or total field can be at least partially cancelled by the cancellation field.

20. A method of operating a safety system comprising a primary unit of at least one primary winding for generating an electromagnetic primary field for the inductive power transfer, a charging surface of the route assigned to the primary winding, and at least one inductive sensing system, wherein the inductive sensing system comprises multiple detection windings, wherein the multiple detection windings are arranged in an array structure, wherein the array structure covers the charging surface at least partially, and wherein the inductive sensing system comprises at least one excitation winding for generating an excitation field which is received by at least one of the multiple detection windings, the method comprising:
measuring an output signal of each of the multiple detection windings,
determining an electrical characteristic or parameter depending on the measured output signal, and
comparing the electrical characteristic or parameter to a reference value.

21. The method of claim 20, further comprising the steps of:
generating an excitation field by at least one excitation winding,
receiving the excitation field by at least one corresponding detection winding, and
evaluating an output voltage of the at least one detection winding.

22. The method according to claim 20, further comprising the steps of:
capturing by an acoustic sensor, sound waves after the excitation field has been generated, and
evaluating an output signal of the acoustic sensor.

23. The method according to claim 20, further comprising the steps of:
emitting a radar or microwave signal along the charging surface,
receiving the reflected radar or microwave signal with at least one microwave receiving device,
conducting a radar- or microwave-based object detection based on the received signal.

24. The method according to claim 20, further comprising the steps of:
generating a cancellation field by at least one primary field or total field cancellation means if a foreign object has been detected.

25. A method of building a safety system comprising a primary unit of at least one primary winding for generating an electromagnetic primary field for the inductive power transfer, a charging surface of the route assigned to the primary winding, and at least one inductive sensing system, wherein the inductive sensing system comprises multiple detection windings, wherein the multiple detection windings are arranged in an array structure, wherein the array structure covers the charging surface at least partially, and wherein the inductive sensing system comprises at least one excitation winding for generating an excitation field which is received by at least one of the multiple detection windings, the method comprising:
providing the multiple detection windings, and
arranging the multiple detection windings in the array structure, wherein the array structure covers the charging surface at least partially.

* * * * *